(12) United States Patent
Howarth et al.

(10) Patent No.: US 9,609,219 B2
(45) Date of Patent: Mar. 28, 2017

(54) SUSPENSION SYSTEM FOR A CAMERA LENS ELEMENT

(71) Applicant: CAMBRIDGE MECHATRONICS LIMITED, Cambridge, Cambridgeshire (GB)

(72) Inventors: James Howarth, Cambridge (GB); Andrew Benjamin David Brown, Cambridge (GB)

(73) Assignee: CAMBRIDGE MECHATRONICS LIMITED, Cambridge, Cambridgeshire (GB)

( * ) Notice: Subject to any disclaimer, the term of this patent is extended or adjusted under 35 U.S.C. 154(b) by 0 days.

(21) Appl. No.: 14/647,405

(22) PCT Filed: Nov. 20, 2013

(86) PCT No.: PCT/GB2013/053062
§ 371 (c)(1),
(2) Date: May 26, 2015

(87) PCT Pub. No.: WO2014/083318
PCT Pub. Date: Jun. 5, 2014

(65) Prior Publication Data
US 2015/0304561 A1 Oct. 22, 2015

(30) Foreign Application Priority Data
Nov. 27, 2012 (GB) .................................. 1221306.2

(51) Int. Cl.
*H04N 5/232* (2006.01)
*G02B 7/02* (2006.01)
(Continued)

(52) U.S. Cl.
CPC ......... *H04N 5/23258* (2013.01); *G02B 7/023* (2013.01); *G02B 7/026* (2013.01);
(Continued)

(58) Field of Classification Search
CPC ........... H04N 5/23258; H04N 5/23287; G02B 7/023; G02B 7/026; G02B 13/001; G02B 27/646
(Continued)

(56) References Cited

U.S. PATENT DOCUMENTS 4,932,210 A  6/1990  Julien et al.
5,279,123 A  1/1994  Wechsler et al.
(Continued)

FOREIGN PATENT DOCUMENTS

CN   202077117 U   12/2011
EP   1659435 A1    5/2006
(Continued)

OTHER PUBLICATIONS

U.S. Appl. No. 14/402,576, filed Nov. 20, 2014.

*Primary Examiner* — Tuan Ho
*Assistant Examiner* — Marly Camargo
(74) *Attorney, Agent, or Firm* — Harness, Dickey & Pierce, P.L.C.

(57) ABSTRACT

A camera lens element is suspended on a support structure by balls that allow movement of the camera lens elementorthogonal to the optical axis and plural flexures connected between the support structure and the camera lens element to bias them against the balls while permitting said movement of the camera lens elementorthogonal to the optical axis. Lateral movement is driven by a lateral actuation arrangement comprising plural SMA actuator wires. The flexures provide a lateral biasing force that biases the camera lens element towards a central position. An electrical connection is made through the flexures from the support structure to the camera lens element. The flexures may be connected to laminated structures.

33 Claims, 12 Drawing Sheets

(51) Int. Cl.
  *G02B 13/00* (2006.01)
  *G02B 27/64* (2006.01)

(52) U.S. Cl.
  CPC ......... *G02B 13/001* (2013.01); *G02B 27/646* (2013.01); *H04N 5/23287* (2013.01)

(58) Field of Classification Search
  USPC ..... 348/208.99, 208.11, 345, 357, 373, 374; 396/79, 85, 93, 102, 130; 359/554, 557, 359/823, 824; 60/527–529
  See application file for complete search history.

(56) References Cited

U.S. PATENT DOCUMENTS

| | | | |
|---|---|---|---|
| 5,684,640 A | 11/1997 | Tanaka et al. | |
| 6,064,827 A | 5/2000 | Toyoda | |
| 8,248,497 B2 | 8/2012 | Tanimura et al. | |
| 2001/0022688 A1 | 9/2001 | Kosaka et al. | |
| 2006/0150627 A1 | 7/2006 | Oohara | |
| 2007/0109412 A1* | 5/2007 | Hara | H04N 5/2251 348/207.1 |
| 2008/0074744 A1 | 3/2008 | Osaka et al. | |
| 2008/0231955 A1 | 9/2008 | Otsuka | |
| 2010/0060776 A1* | 3/2010 | Topliss | F03G 7/065 348/340 |
| 2010/0074608 A1* | 3/2010 | Topliss | G03B 3/10 396/133 |
| 2010/0265343 A1 | 10/2010 | Lee et al. | |
| 2011/0013283 A1 | 1/2011 | Sato | |
| 2011/0179786 A1* | 7/2011 | Topliss | F03G 7/065 60/527 |
| 2011/0279916 A1* | 11/2011 | Brown | F03G 7/065 359/823 |
| 2011/0292509 A1 | 12/2011 | Yasuda | |
| 2013/0222685 A1* | 8/2013 | Topliss | G02B 27/646 348/373 |
| 2014/0028906 A1* | 1/2014 | Chen | H04N 5/228 348/208.2 |
| 2014/0055630 A1* | 2/2014 | Gregory | G03B 3/02 348/208.2 |
| 2015/0135703 A1* | 5/2015 | Eddington | F03G 7/065 60/528 |

FOREIGN PATENT DOCUMENTS

| | | |
|---|---|---|
| WO | WO-2007-113478 A1 | 10/2007 |
| WO | WO-2010-029316 A2 | 3/2010 |
| WO | WO-2010-089529 A1 | 8/2010 |
| WO | WO-2011-104518 A1 | 9/2011 |
| WO | WO-2012-020212 A1 | 2/2012 |
| WO | WO-2012-038703 A2 | 3/2012 |
| WO | WO-2012-066285 A1 | 5/2012 |
| WO | WO-2012-077285 A1 | 6/2012 |
| WO | WO-2013-118601 A1 | 8/2013 |
| WO | WO-2013-153400 A2 | 10/2013 |
| WO | WO-2013-175197 A1 | 11/2013 |
| WO | WO-2014-076463 A1 | 5/2014 |

\* cited by examiner

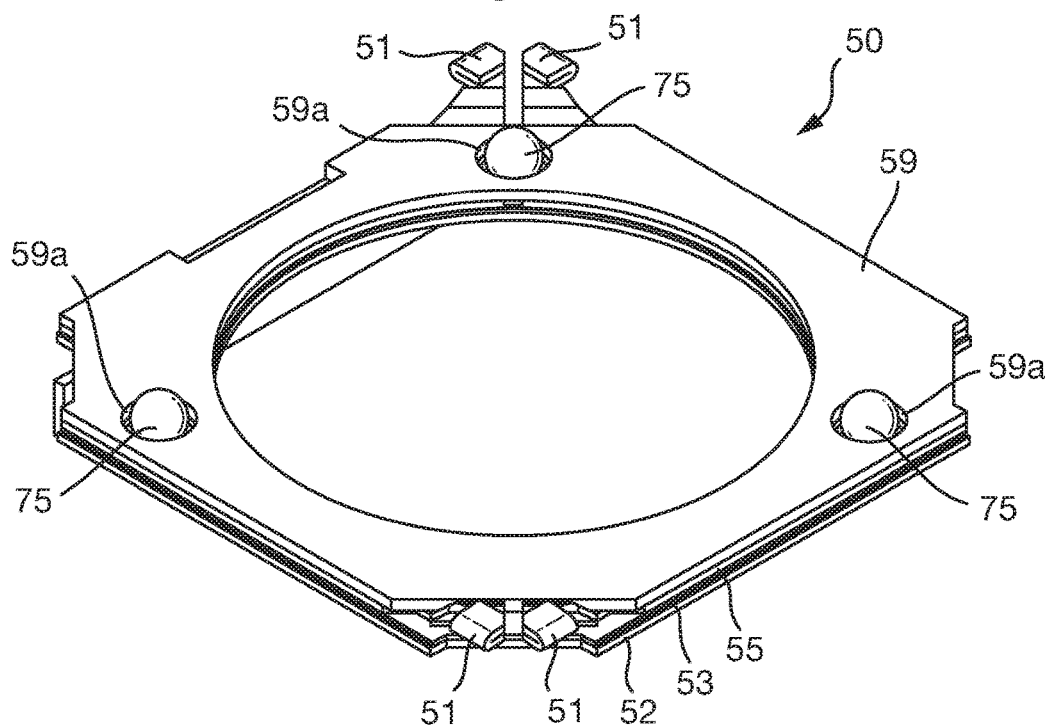
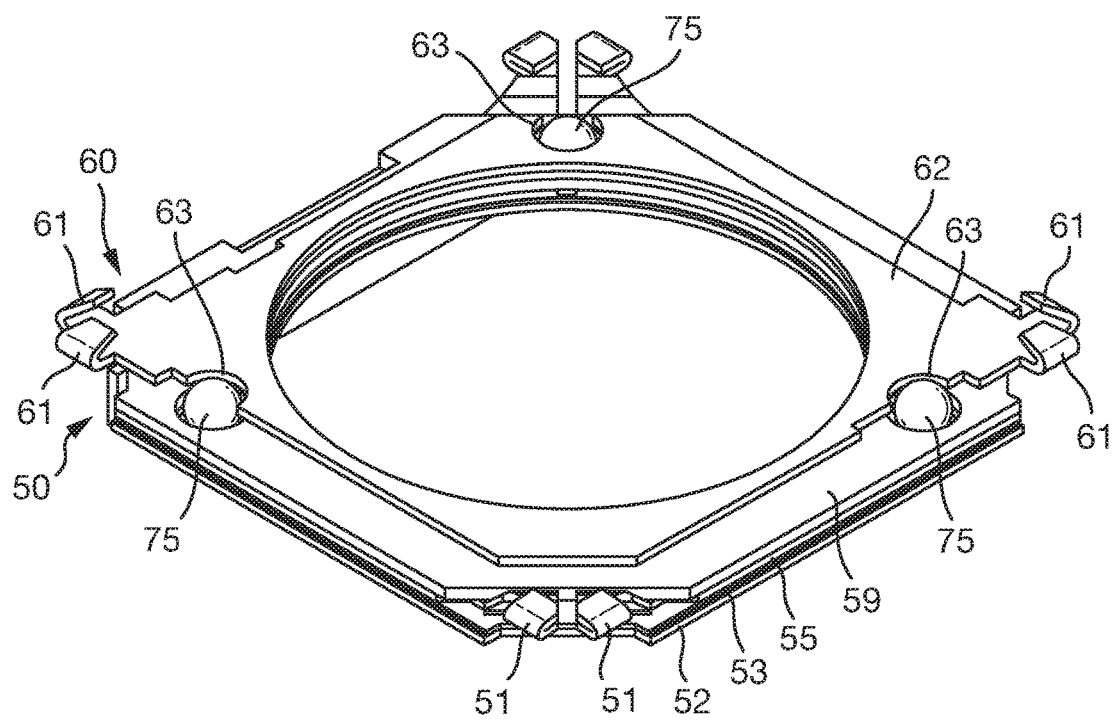

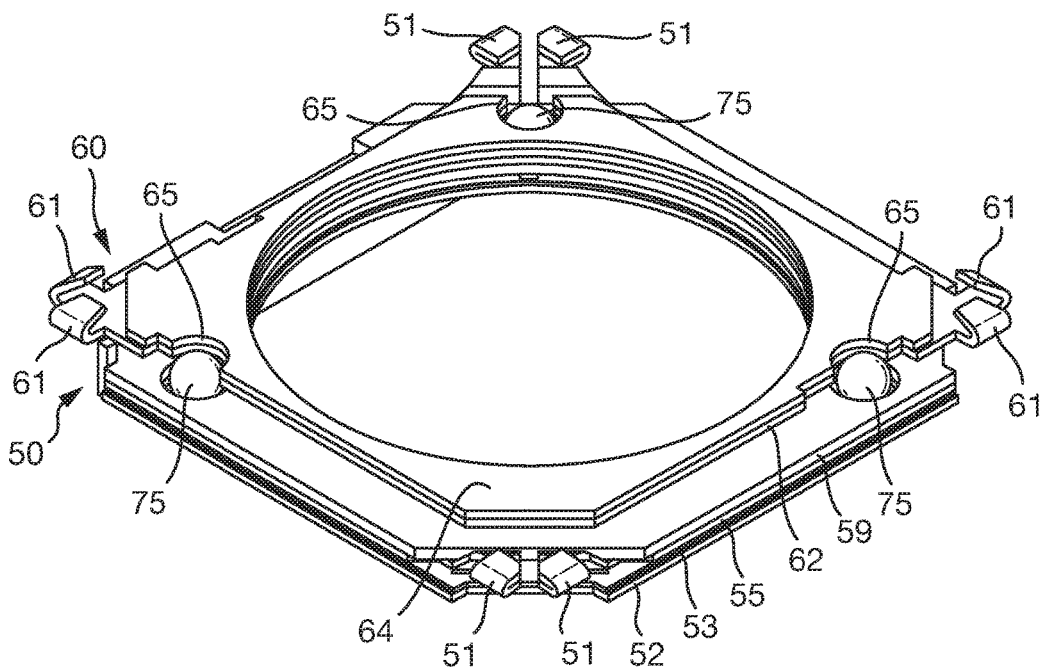
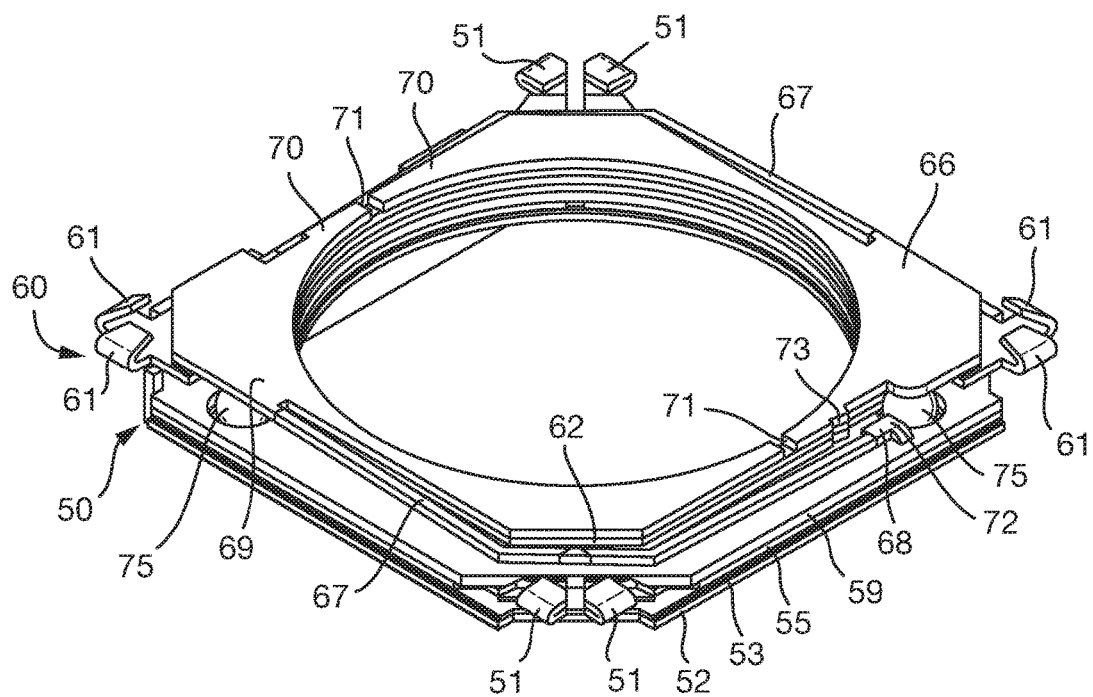

SUSPENSION SYSTEM FOR A CAMERA LENS ELEMENT

CROSS REFERENCE TO RELATED APPLICATIONS

This application is a U.S. National Phase Application under 35 U.S.C. 371 of International Application No. PCT/GB2013/053062 filed on Nov. 20, 2013 and published as WO 2014/083318 A1 on Jun. 5, 2014. This application claims priority to British Application No. 1221306.2 filed on Nov. 27, 2012. The entire disclosure of each of the above applications is incorporated herein by reference.

The present invention relates to the suspension of a camera lens element in a manner allowing movement orthogonal to the optical axis. Such movement may be utilised to provide optical image stabilisation (OIS) of an image focused by the camera lens element on an image sensor.

The purpose of OIS is to compensate for camera shake, that is vibration of the camera apparatus, typically caused by user hand movement, that degrades the quality of the image captured by the image sensor. OIS typically involves detection of the vibration by a vibration sensor such as a gyroscope sensor, and control on the basis of the detected vibration of an actuation arrangement that adjusts the camera apparatus to compensate for the vibration. Several techniques for adjusting the camera apparatus are known.

In one type of OIS technique, the captured image is processed. However, this requires significant processing power.

In another type of technique, the optical system of the camera is adjusted mechanically. Some examples of this type of technique are as follows.

A number of mechanical OIS techniques that are known and applied successfully in relatively large camera apparatuses, such as digital still cameras, are difficult to miniaturise. Cameras are becoming very common in a wide range of portable electronic equipment, for example mobile telephones and tablet computers, and in many such applications miniaturisation of the camera is important. The very tight packaging of components in miniature camera apparatuses presents great difficulties in adding OIS actuators within the desired package.

WO-2010/029316 and WO-2010/089529 both disclose an alternative technique of the type in which the optical system of the camera is adjusted mechanically. In this technique, the camera unit comprising an image sensor and a lens system for focussing an image on the image sensor is tilted relative to the support structure of the camera around two notional axes that are perpendicular to each other and to the optical axis of the lens system. WO-2010/029316 and WO-2010/089529 disclose in particular actuation arrangements comprising a plurality of SMA actuators arranged to drive tilting of the camera unit. WO-2011/104518 discloses an SMA actuation apparatus in which SMA actuator wire is used to provide OIS in a camera by driving tilting of a camera unit, but with additional degrees of freedom. In such a camera, sufficient clearance needs to be provided to allow for tilting of the entire camera unit.

To reduce the size of the overall package for the camera, it has been considered to provide OIS by moving a camera lens element orthogonal to the optical axis of the at least one lens. This has the potential to reduce the size of the overall package for the camera because only the camera lens element is moved and the lateral movement thereof requires less clearance than tilting the entire camera. Such a type of OIS will be referred to herein as "OIS shift".

An OIS-shift apparatus requires some form of suspension system, because the movement is only driven laterally and so any actuation arrangement will not in general be operative to locate the camera lens element along the optical axis.

A useful suspension system desirably permits movement of the camera lens element relative to the support structure orthogonal to the optical axis but prevents movement along the optical axis. An example of a known suspension system comprises a plurality of beams, for example made of wire, extending parallel to the optical axis so that movement orthogonal to the optical axis is accommodated by flexing of the beams. However, such a suspension is limited in the amount of travel orthogonal to the optical axis permitted and is vulnerable to damage in case of exceptional loads, which may occur for example if the camera is dropped.

According to the present invention, there is provided a suspension system for suspending a camera lens element comprising at least one lens in a manner allowing movement orthogonal to the optical axis of the at least one lens, the suspension system comprising:

a support structure;

a camera lens element comprising at least one lens having an optical axis;

at least one ball disposed between the support structure and the camera lens element allowing movement of the camera lens element relative to the support structure orthogonal to the optical axis; and a biasing arrangement connected between the support structure and the camera lens element that biases the support structure and the camera lens element against the at least one ball whilst permitting said movement of the camera lens element relative to the support structure orthogonal to the optical axis.

The suspension system of the present invention uses at least one ball and a biasing arrangement that is connected between the support structure and the camera lens element and biases the support structure and the camera lens element against the balls, typically parallel to the optical axis. In this manner, the camera lens element is effectively held against the against the balls and so constrained from moving along the optical axis relative to the support structure. At the same time, the balls bear movement of the camera lens element relative to the support structure orthogonal to the optical axis. The biasing element is selected to permit such movement. Consequently, the suspension system allows for movement orthogonal to the optical axis with little resistance while the biasing element provides for the suspension system to be robust against exceptional loads.

The advantages are particularly beneficial in a miniature camera, for example wherein the one or more lenses have a diameter of at most 10 mm.

The suspension system may be used in a camera wherein an image sensor is mounted on the support structure.

There may be provided a lateral actuation arrangement arranged to move the movable element relative to the support structure in any direction orthogonal to the optical axis of the at least one lens. Although any suitable actuation arrangement may be applied, particular advantage is achieved by a lateral actuation arrangement comprising plural SMA actuator wires connected between the support structure and the camera lens element. The SMA actuator wires may be connected in an arrangement so that, on selective driving, they move the movable element relative to the support structure in any direction orthogonal to the optical axis of the at least one lens.

A lateral control circuit may be provided for generating drive signals for the lateral actuation arrangement. To provide OIS, there may further be provided a vibration sensor arranged to generate output signals representative of the vibration of the camera. In this case, the lateral control circuit may be arranged to generate drive signals for the SMA actuator wires in response to the output signals of the vibration sensor for driving the movement of the camera lens element to stabilise an image focused by the camera lens element.

As well as axial biasing, the biasing arrangement may be arranged to provide a lateral biasing force that biases the camera lens element towards a central position. This provides the advantage that, in the absence of driving of the movement of the camera lens element, the camera lens element will tend towards the central position. This has the effect that a camera incorporating the camera lens element may remain functional in the event that the camera lens element is not driven, for example in the event of a malfunction or in a power-saving mode of operation.

The biasing arrangement may comprise at least one flexure, preferably plural flexures. The use of flexures provides a number of advantages. Flexures may be conveniently designed to provide the desired functional effect of biasing the support structure and the camera lens element against the at least one ball whilst permitting said movement of the camera lens element relative to the support structure orthogonal to the optical axis. Flexures may also be conveniently designed to provide a lateral biasing force that biases the camera lens element towards a central position. Furthermore, flexures are capable of providing these functions with a mechanical structure that is compact and lightweight.

Such flexures may have a number of advantageous features as follows.

The average width of the at least one flexure orthogonal to the optical axis may be greater than the average thickness of the at least one flexure parallel to the optical axis.

The at least one flexure may be arranged to be deflected from its relaxed state so that it provides a pre-loading force that biases the support structure and the camera lens element against the at least one ball.

The distance between the ends of the at least one flexure resolved in a direction orthogonal to the optical axis may be greater than the distance between the ends of the at least one flexure resolved in a direction parallel to the optical axis.

The at least one flexure may extend at least 90° around the optical axis as measured between the ends of the at least one flexure.

The length of the at least one flexure may be greater than the average width of the at least one flexure orthogonal to the optical axis.

Each of these features, that may be applied in any combination, provides the advantage of increasing the biasing force relative to the lateral biasing force which is desirably relatively low so as to permit lateral movement.

The at least one flexure may be formed from sheet material that additionally comprises a base fitting at one end of the at least one flexure that is mounted to the support structure and a moving fitting at the other end of the at least one flexure that is mounted to the camera lens element.

The support structure may comprise a support plate formed from sheet material to which the base fitting is mounted, and the camera lens element may comprise a moving plate formed from sheet material to which the moving fitting is mounted.

The suspension system may comprise a support assembly forming part of the support structure and a moving assembly forming part of the camera lens element, wherein each of the support assembly and the moving assembly has a laminated structure and the at least one flexure is connected between the support assembly and the moving assembly. The use of such laminated structures provides a compact construction that is easy to manufacture.

The use of sheet material for the support plate and the moving plate provides a compact structure that is easy to manufacture. It further allows for the sheet material of the support plate and/or moving plate to be laminated with other sheet material to provide desired mechanical and/or electrical properties. Some examples of advantageous structures for the support plate and moving plate are as follows.

In the case that there is provided a lateral actuation arrangement comprising plural SMA actuator wires connected between the support structure and the camera lens element in an arrangement wherein the SMA actuator wires are arranged, on selective driving, to move the movable element relative to the support structure in any direction orthogonal to the optical axis of the at least one lens, then the support plate and moving plate may each be formed from sheet material and be shaped with crimps crimping the SMA actuator wires. This provides for mounting of the SMA actuator wires with a mechanical structure that is convenient and easy to manufacture.

Furthermore, the support plate may be split into at least two electrically isolated parts each crimped to different SMA actuator wires. In this way, the support plate may serve a dual purpose of mounting the SMA actuator wires and providing electrical connection to the static end of the SMA actuator wires at the support structure. For example, if there are a total of four SMA wires, the support plate may be split into four electrically isolated parts each crimped to a different SMA actuator wire to provide connections for independent actuation of each SMA actuator wire.

A bearing plate formed from sheet material may be laminated with the support plate, the bearing plate bearing the at least one ball. The bearing plate may be provided with suitable properties for the bearing function. In that case, the bearing plate may be provided on the opposite side of the support plate from the camera lens element, with the support plate having an aperture in respect of the or each ball through which the at least one ball engages the bearing plate. In this structure, the apertures in the support plate locate and retain the balls laterally.

The moving plate may be a single plate shaped with crimps crimping each SMA actuator wire. In this case, the moving plate may provide a common electrical connection to all of the SMA actuator wires.

The moving fitting may be a plate laminated with the moving plate. In that case, the moving fitting may bear the at least one ball.

The moving fitting may be split into at least two electrically isolated parts each connected to different flexures, at least one of which is electrically connected to the moving plate. In this way, the moving fitting may serve a dual purpose of connecting the flexures and providing electrical connection to the moving end of the SMA actuator wires at the camera lens element.

Typically, one or more electrically insulating layers may be laminated with the support plate and/or one or more electrically insulating layers may be laminated with the moving plate, to provide electrical isolation between the components.

An electrical connection may be made through the at least one flexure from the support structure to the camera lens element. This provides a further advantage to the use of flexures in that they may serve a dual purpose of providing the desired mechanical function and providing an electrical connection to the support structure. Provision of a separate electrical connection would require a wire or other conductive element that risks affecting the mechanical performance of the flexures. Furthermore, flexures are intrinsically suited to providing an electrical connection due to their elongate nature.

Electrical connections may be provided through the at least one flexures in a number of ways, some examples of which are as follows.

In the case that there is provided a lateral actuation arrangement comprising plural SMA actuator wires connected between the support structure and the camera lens element in an arrangement wherein the SMA actuator wires are arranged, on selective driving, to move the movable element relative to the support structure in any direction orthogonal to the optical axis of the at least one lens, then an electrical connection may be made through the at least one flexure to the SMA actuator wires. Such an electrical connection may be made from a lateral control circuit for generating drive signals for the SMA actuator wires.

In the case that the camera lens element comprises: a lens carriage; one or more lenses supported on the lens carriage in a manner in which at least one of the one or more lenses is movable along the optical axis relative to the lens carriage; and an axial actuation arrangement arranged to drive movement of said at least one of the one or more lenses along the optical axis relative to the lens carriage, then an electrical connection may be made through the at least one flexure to the axial actuation arrangement. Such an electrical connection may be made from an axial control circuit for generating drive signals for the axial actuation arrangement through at least two of the flexures to complete the circuit. Such axial movement may provide focussing or zooming.

To allow better understanding, an embodiment of the present invention will now be described by way of non-limitative example with reference to the accompanying drawings, in which:

FIGS. 3 to 10 are perspective views of successive laminated components of the suspension system of FIG. 2;

Figure 1:
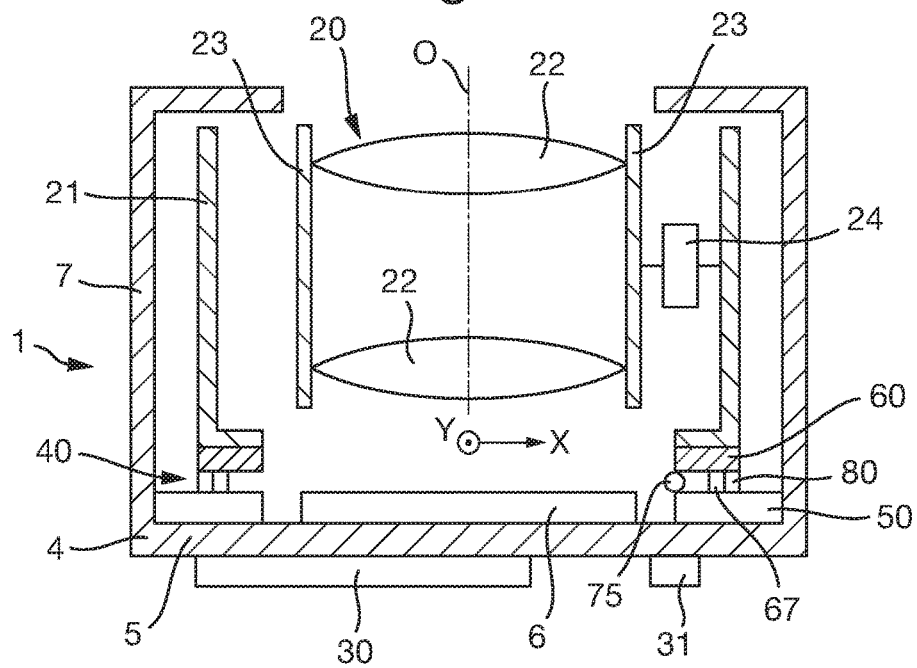
FIG. 1 is a schematic cross-sectional view of a camera apparatus.

A camera apparatus 1 that incorporates a suspension system 40 in accordance with the present invention is shown in FIG. 1, which is a cross-sectional view taken along the optical axis O. The camera apparatus 1 is to be incorporated in a portable electronic device such as a mobile telephone, or tablet computer. Thus, miniaturisation is an important design criterion.

The camera apparatus 1 comprises a camera lens element 20 suspended on a support structure 4 by a suspension system 40, described in detail below.

The support structure 4 is a camera support supporting an image sensor 6 on the front side of a base 5 thereof. On the rear side of the base 5, there is mounted an IC (integrated circuit) chip 30 and a gyroscope sensor 31. The support structure 4 also comprises a can 7 protruding forwardly from the base 5 to encase and protect the other components of the camera apparatus 1.

The camera lens element 20 comprises a lens carriage 21 in the form of a cylindrical body supporting two lenses 22 arranged along the optical axis O, although in general any number of one or more lenses 22 may be provided. The camera apparatus 1 is a miniature camera in which the lenses 22 have a diameter of at most 10 mm.

The camera lens element 20 is arranged to focus an image onto the image sensor 6. The image sensor 6 captures the image and may be of any suitable type, for example a CCD (charge-coupled device) or a CMOS (complimentary metal-oxide-semiconductor) device.

Whilst the lenses 22 could be fixed relative to the lens carriage 21, in this example the lenses 22 are supported on the lens carriage 21 in a manner in which the lenses 22 are movable along the optical axis O relative to the lens carriage 21, for example to provide focussing or zoom. In particular, the lenses 22 are fixed to lens holder 23 which is movable along the optical axis O relative to the lens carriage 21. Although all the lenses 22 are fixed to the lens holder 23 in this example, in general one or more of the lenses 22 may be fixed to the lens carriage 21 and so not movable along the optical axis O relative to the lens carriage 21, leaving at least one of the lenses 22 fixed to the lens holder 23.

An axial actuation arrangement 24 provided between the lens carriage 21 and the lens holder 23 is arranged to drive movement of the lens holder 21 and lenses 22 along the optical axis O relative to the lens carriage 21. The axial actuation arrangement 24 is shown schematically in FIG. 1 and may be any suitable type, for example being a voice coil motor (VCM) or an arrangement of SMA actuator wires, such as is described in WO-2007/113478 which is incorporated herein by reference.

As will now be described, the suspension system 40 suspends the camera lens element 20 in manner allowing movement of the camera lens element 20 relative to the support structure 4 orthogonal to the optical axis O. Thus, the camera lens element 20 is a movable element. In operation, the camera lens element 20 is moved orthogonally to the optical axis O in two orthogonal directions, shown as X and Y, relative to the image sensor 6, with the effect that the image on the image sensor 6 is moved. This is used to provide OIS, compensating for image movement of the camera apparatus 1, caused by for example hand shake.

In many known arrangements using SMA actuator wire to provide an OIS function, for example as disclosed in WO-2010/029316 and WO-2010/089529, the OIS is provided by tilting an entire camera unit including a camera lens element and an image sensor. This method of compensating for user handshake does in principle give the best OIS performance, because aligning the camera lens element to the image sensor is difficult in miniature cameras and the manufacturing tolerances are very tight. In addition, the user handshake being compensated for is essentially a tilt to the camera, and so it makes intuitive sense that the compensation should also tilt the camera. However, in this example, OIS is performed differently in order to mitigate several other problems.

The first problem is that with the 'camera tilt' method, the image sensor is moving, relative to the fixed camera structure. This presents extreme difficulties in routing electrical connections from the image sensor to the fixed structure of the camera, and onto the mobile phone motherboard. Solutions to this centre around flexible printed circuits (FPCs) to route connections, but the FPC design remains challenging, owing to the large number of connections, and the high data rates. Therefore, it is highly desirable for the image sensor to remain stationary and fixed.

The second problem is that the camera tilt method implies that there is a camera structure comprising as a minimum the lens and image sensor, with support structures that must tilt inside a surrounding support structure. Because the camera has a finite footprint, the tilt of the camera means that the camera thickness (height) of the OIS camera must be greater than for an equivalent camera without OIS. In mobile phones, it is highly desirable to minimise the camera height.

The third problem, is that by tilting the whole camera, it is difficult to package the tilting actuators without increasing the footprint of the camera over that of the camera without OIS.

Accordingly, in this example, the camera lens element 20 is moved linearly in two orthogonal directions, both perpendicular to the optical axis O being an example of OIS shift. The resulting image compensation does not entirely reverse the effects of user handshake, but the performance is deemed sufficiently good, given the constraints described above, and in particular allows the size of the camera apparatus 1 to be reduced as compared to an apparatus using tilt.

The suspension system 40 will now be described in detail. Several alternative constructions for the suspension system 40 will be described.

In each construction, the suspension system 40 comprises: (a) a support assembly 50 forming part of the support structure 4 and connected to the base 5; and (b) a moving assembly 60 forming part of the camera lens element 20 and connected to the lens carriage 21. In each construction, the moving assembly 60 is supported on the support assembly 50 by plural balls 75 and plural flexures 67. Each construction has three balls 75. Although in general any number of balls 75 could be provided, it is preferable to provide at least three balls 75 to prevent relative tilting of the moving assembly 60 and the support assembly 50. Three balls 75 are sufficient to support the moving element 3 without tilting, and the provision of three balls 75 has the advantage of easing the tolerances required to maintain point contact with each ball 75 in a common plane. It would be possible to use more than three balls, for example four balls, which would allow a symmetrical design.

Each of the components of the support assembly 50 and the moving assembly 60 is provided with a central aperture aligned with the optical axis O allowing the passage of light from the camera lens element 20 to the image sensor 6.

In each construction, movement of the camera lens element 20 relative to the support structure 4 is driven by a lateral actuation arrangement comprising plural SMA actuator wires 80 connected between the support assembly 50 and the moving assembly 60 and hence between the support structure 4 and the camera lens element 20.

The balls 75 act as rotary bearings, and may be spherical or may in general be any rotary element with curved surfaces that bear against the support assembly 50 and the moving assembly 60 and are able to roll back and forth and around in operation.

The balls 75, the flexures 67, and the SMA actuator wires 80 are shown schematically in FIG. 1 but shown in detail in the further drawings.

The first construction of the suspension system 40 is shown in FIGS. 2 to 10. In this construction, the moving assembly 60 and the support assembly 50 each have a laminated construction which makes them compact and easy to manufacture.

The suspension system 40 comprises several insulator layers as described below. These may each be made of any suitable electrically insulating material, for example a polymer material such as kapton which is a polyimide material commonly used in printed circuits.

Adhesive is used to bond together the various layers that are laminated as described below. The adhesive may be in any suitable form, for example adhesive-impregnated kapton or a double sided adhesive between the bonded surfaces.

As described below, various components in the laminated construction are formed from sheet material. These components may be manufactured from a larger sheet. Shaping may be performed by cutting, or alternatively punching, etching or stamping.

Figure 2:
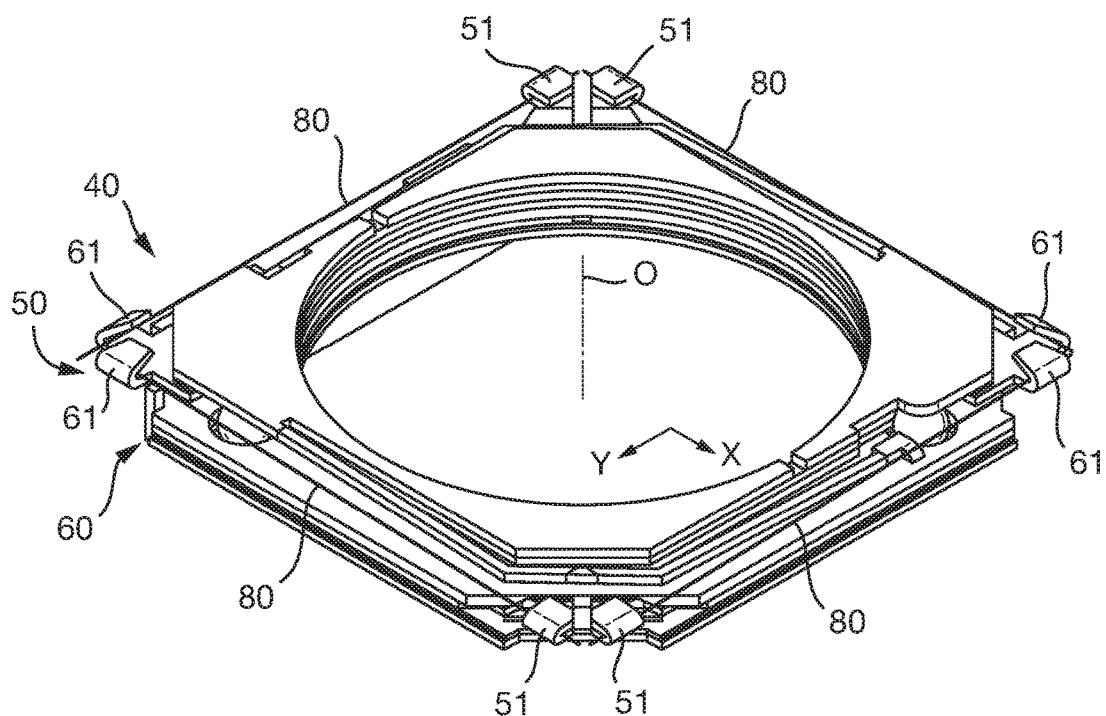
FIG. 2 is a perspective view of the suspension system of the camera apparatus in a first construction.

The overall suspension system 40 is shown in FIG. 2 which illustrates the four SMA actuator wires 80 connected to the support assembly 50 by crimps 51 and to the moving assembly 60 by crimps 61. Each of the SMA actuator wires 80 is held in tension, thereby applying a force between the support assembly 50 and the moving assembly 60 in a direction perpendicular to the optical axis O. In operation, the SMA actuator wires 80 are selectively driven to move the camera lens element 20 relative to the support structure 4 in any direction orthogonal to the optical axis O, as described further below.

For clarity, successive components of the suspension system 40 in the laminated construction are shown in FIGS. 3 to 10 as will now be described.

Figure 3:
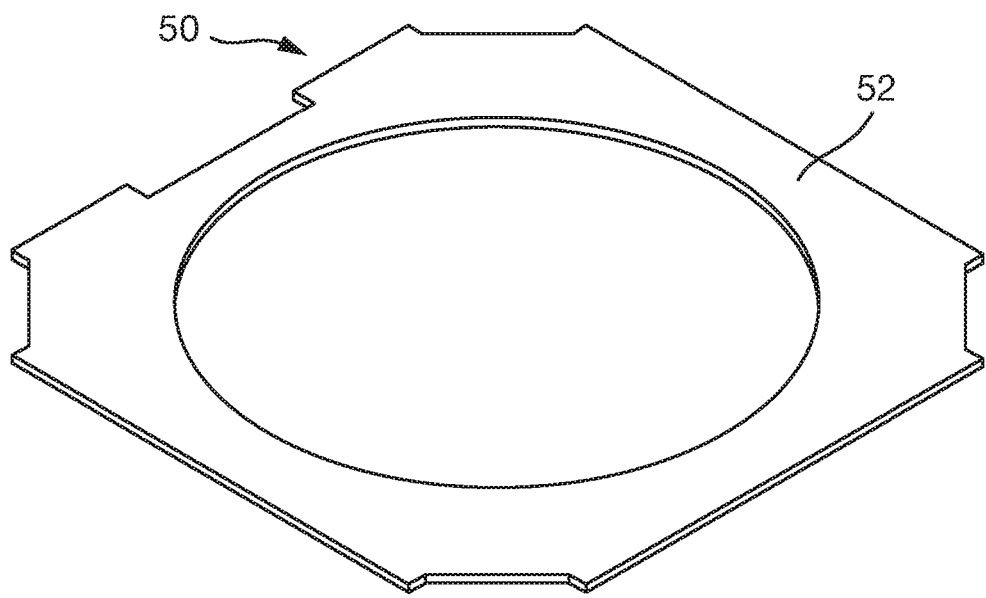

As shown in FIG. 3, the support assembly 50 comprises a bearing plate 52 formed from sheet material. The bearing plate 52 has the purpose of bearing the balls 75. The bearing plate 52 is made of a suitable material for providing an efficient bearing, preferably a relatively stiff material such as metal, e.g. steel such as stainless steel. The bearing plate 52 is the component of the support assembly 50 that is attached to the base 5 of the support structure 4.

Figure 4:
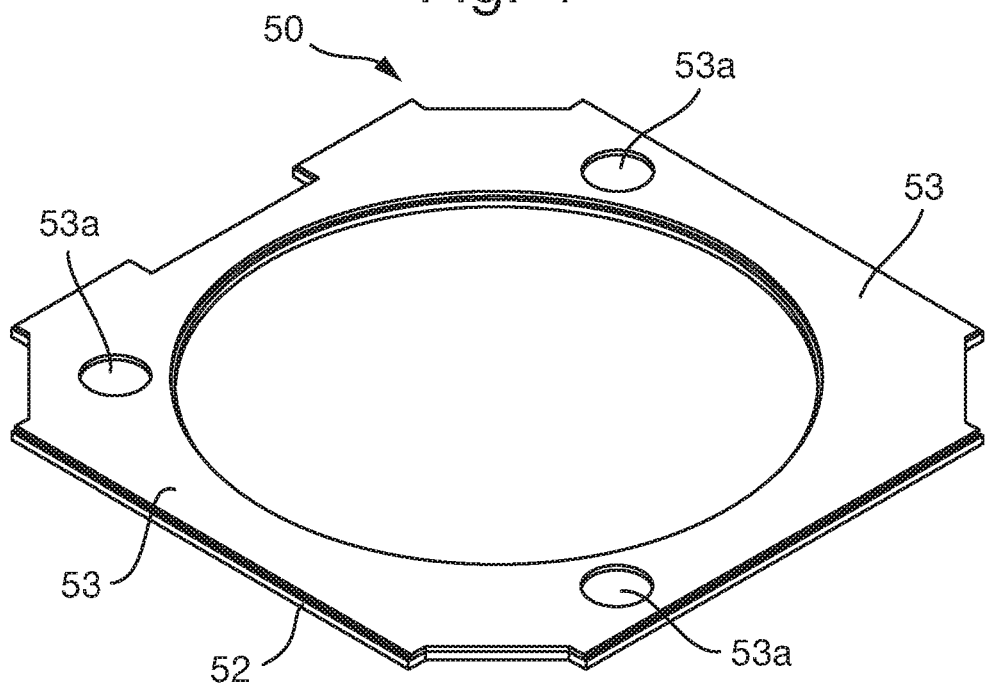

As shown in FIG. 4, a first insulator layer 53 is laminated to the top surface of the bearing plate 52. The first insulator layer 53 is formed from sheet material and is a similar shape to the bearing plate 52. The first insulator layer 53 has three apertures 53a, one in respect of each ball 75, through which the balls 75 engage the bearing plate 52.

Figure 5:
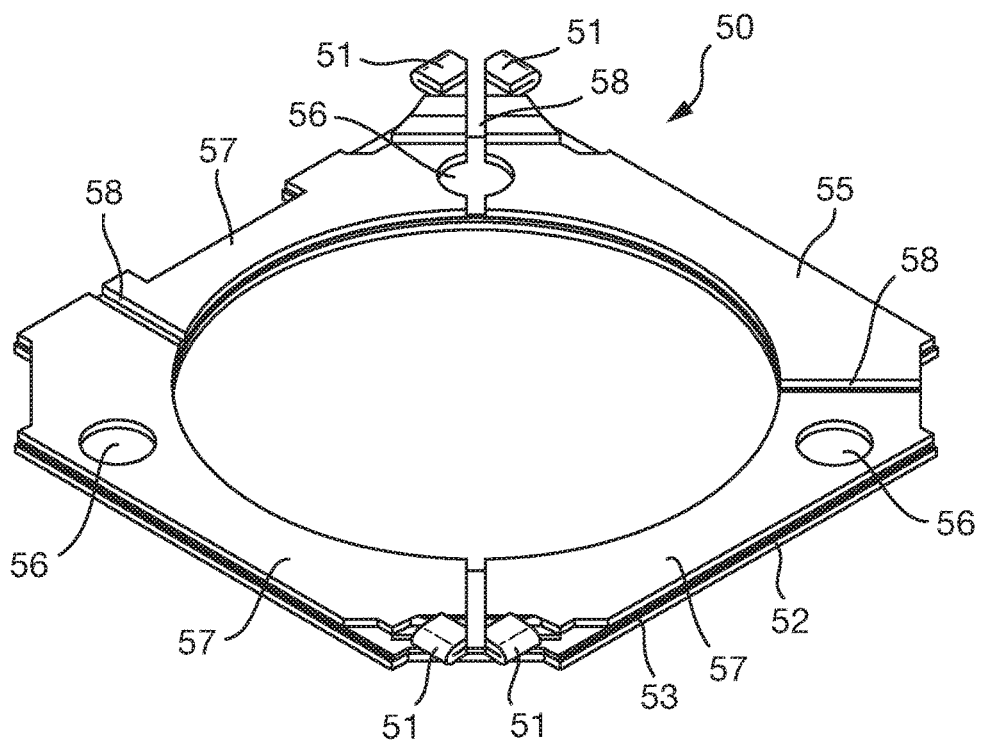

As shown in FIG. 5, a support plate 55 of the support assembly 50 is laminated to the top surface of the first insulator layer 53 and hence to the bearing plate 52. The support plate 55 is formed from sheet material. The support plate 55 is shaped to form the four crimps 51 that crimp the static ends of the SMA actuator wires 80. The support plate 55 is made from a suitable material to provide mechanical and electrical connection to the SMA actuator wires 80, typically a metal, for example phosphor bronze.

The support plate 55 is split into four electrically isolated parts 57 by gaps 58, each of the parts 57 including one of the crimps 51 crimped to a different one of the SMA actuator wires 80. This allows a separate electrical connection to be made to the SMA actuator wires 80 through the parts 57 of the support plate 55, thereby allowing the SMA actuator wires 80 to be driven separately. The parts 57 of the support plate 55 are held together by the bearing plate 52.

The crimps 51 are made to stand proud of the remainder of the support plate 55 by bending the corners of the support plate 55 where the crimps 51 are located. The purpose the crimps 51 protruding in this way is to place them at the same level as the crimps 41 on the camera lens element 20 such that the SMA wires 80 are perpendicular to the optical axis O. Advantageously, the crimps 51 may be bent around a line that is diagonal across two opposed corners of the support plate 55 to facilitate accurate bending. Each of the two opposed corners of support plate 55 may then be split to provide two crimps 51, which are then bent over the SMA wires 80 to provide mechanical electrical connections.

The support plate 55 has three apertures 56, one in respect of each ball 75 and aligned with the apertures 53a in the first insulator layer 53. Thus the bearing plate 52 is on the opposite side of the support plate 55 from the camera lens element 20 and the balls 75 engage the bearing plate 52 through the apertures 56. As a result, the apertures 56 locate and retain the balls 75 laterally. For OIS in a miniature camera, lateral movements of +/−75 microns are typically required. The apertures 56 are made to have a clearance greater than this all round the balls 75, and may typically have a clearance of 150 microns on all sides of the ball 75. In normal operation, the balls 75 are held between the camera lens element 20 and the support structure 4, and little or no movement in the direction parallel to the optical axis O is possible.

Figure 6:
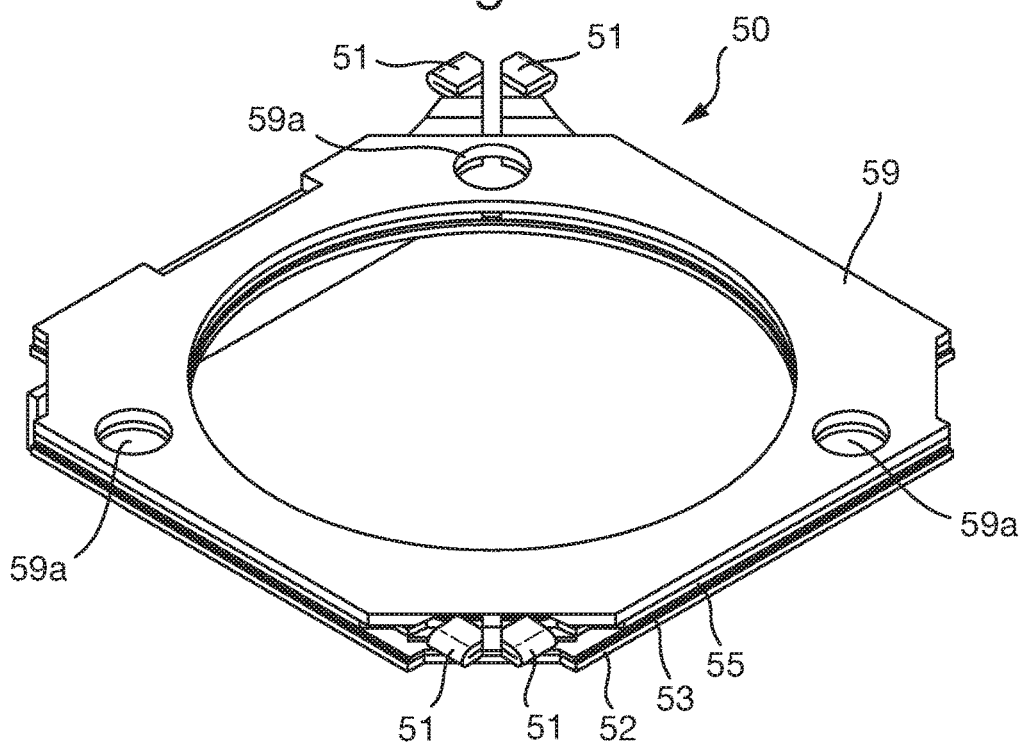

As shown in FIG. 6, a second insulator layer 59 is laminated to the top surface of the support plate 55. The second insulator layer 59 is formed from sheet material and is a similar shape to the support plate 55, although without the gaps 58. The second insulator layer 59 has three apertures 59a, one in respect of each ball 75 and aligned with the apertures 56, through which the balls 75, that are disposed in the apertures 56, engage the bearing plate 52, as shown in FIG. 7.

The second insulator layer 59 carries a flexible printed circuit (FPC) including electrical connections to various components of the camera apparatus 1, including the IC circuit 30. The second insulator layer 59 has connections on its underside to each of the four parts 57 for providing drive signals to each SMA actuator wire 80. The second insulator layer 59 is also connected to components of the camera lens element 20 as described below.

As shown in FIG. 8, the first layer of the moving assembly 60 is a moving plate 62. To allow the moving assembly 60 to move relative to the support assembly 50, there is a separation between the moving plate 62 and the second insulator layer 59. The moving plate 62 is the component of the moving assembly 60 that is attached to the lens carriage 21 of the camera lens element 20. The moving plate 62 is formed from sheet material. The moving plate 62 is shaped to form the four crimps 61 that crimp the moving ends of each SMA actuator wire 80. The moving plate 62 is made from a suitable material to provide mechanical and electrical connection to the SMA actuator wires 80, typically a metal, for example phosphor bronze.

Since the moving plate 62 is made as a single plate, the four crimps 61 and the moving ends of each SMA actuator wire 80 are electrically connected in common. As described below, an electrical connection is made from the moving plate 62 to the FPC of the second insulator layer 59. In principle, in a similar manner to the support plate 55, the moving plate 62 could be split into four electrically isolated parts, each of the parts including one of the crimps 61 crimped to a different one of the SMA actuator wires 80 to allow a separate electrical connection to be made to the SMA actuator wires 80, if desired, for example in order to isolate the drive signals for each SMA actuator wire 80.

The moving plate 62 has cut-outs 63 that provide space for the balls 75.

As shown in FIG. 9, a third insulator layer 64 is laminated to the top surface of the moving plate 62. The third insulator layer 64 is formed from sheet material and is a similar shape to the moving plate 62, having cut-outs 65 aligned with the cut-outs 63 to provide space for the balls 75.

As shown in FIG. 10, the final layer of the moving assembly 60 is a flexure element 66. The flexure element 66 is formed from sheet material and comprises two flexures 67 each extending between a base fitting 68 and a moving fitting 69.

The base fitting 68 takes the form of two relatively small pads 72 on the static end of each flexure 67 (only one of which pads 72 is visible in FIG. 10 but the flexure element 66 is symmetrical) that are electrically isolated from each other. Thus, each pad 72 is formed integrally from the same sheet material as one of the flexures 67. The pads 72 are mounted to the second insulator layer 59 and hence to the support plate 55 and the support structure 4 as a whole. The pads 72 are each electrically connected to the FPC of the second insulator layer 59. The pads 72 may be mounted by soldering which provides both the mechanical and electrical connection.

The moving fitting 69 at the moving end of the flexures 67 is a plate that is mounted to the moving plate 62 by being laminated thereto, and hence mounted to the camera lens element 20 as a whole. The moving fitting 69 bears the balls 75. In this manner, the balls 75 are disposed between the support structure 4 and the camera lens element 20 and act as rotary bearings allowing movement of the camera lens element 20 relative to the support structure 4 orthogonal to the optical axis O.

The moving fitting 69 is split into two electrically isolated parts 70 by gaps 71, each of the parts 70 being connected to a different flexure 67. Thus, each part 70 is formed integrally from the same sheet material as one of the flexures 67. The parts 70 are held together by the moving plate 62. This allows separate electrical connections to be made through each flexure 67 and the pads 72, from the FPC of the second insulator layer 59 to the parts 70 of the moving fitting 69 which are themselves electrically connected to components of the camera lens element 20.

One of the parts 70 of the moving fitting 69 is electrically connected to the moving plate 62 by a tab 73 folded over the edge of the moving fitting 69 and moving plate 62. In operation, this connection may be provided with a fixed potential, e.g. ground, for the SMA actuator wires 80. Both of the parts 70 of the moving fitting 69 are electrically connected to the axial actuation arrangement 24 to complete a circuit for supplying drive signals thereto. Thus the connection provided with a fixed potential is used for both the SMA actuator wires 80 and the axial actuation arrangement 24.

Thus, the flexures 67 have a dual purpose of providing a mechanical function as described below and providing electrical connections from the support structure 4 to the camera lens element 20.

The flexures 67 are arranged as follows to provide their mechanical function. Each flexure 67 is an elongate beam connected between the support structure 4 and the camera lens element 20. The length of the flexures 67 is greater than their average width orthogonal to the optical axis O.

The flexures 67, due to their intrinsic resilience, bias the support structure 4 and the camera lens element 20 against the balls 75, the biasing force being applied parallel to the optical axis. This maintains the contact with the balls 75. At the same time, the flexures 67 may be laterally deflected to permit said movement of the camera lens element 20 relative to the support structure 4 orthogonal to the optical axis O, to permit an OIS function driven by the SMA actuator wires 80.

The flexures 67, again due to their intrinsic resilience, provide a lateral biasing force that biases the camera lens element 20 towards a central position. As a result, in the absence of driving of the lateral movement of the camera lens element 20, the camera lens element 20 will tend towards the central position. Thus the camera apparatus 1 remains functional in the event that the OIS function is not provided, for example in the event of a malfunction or in a power-saving mode of operation.

The flexures 67 are designed as follows to provide a suitable retaining force on the balls 75 along the optical axis O and also to permit lateral movement with a lateral biasing force. The magnitude of the lateral biasing force is kept low enough as not to hinder OIS, whilst being high enough to centre the camera lens element 20 in the absence of driving.

Each flexure 67 has a cross-section with an average width orthogonal to the optical axis is that is greater than its average thickness parallel to the optical axis, that being the thickness of the sheet material from which the flexure element 66 is formed. Each flexure 67 extends in an L-shape around the optical axis O, it in general being desirable that the angular extent is at least 90° as measured between the ends of the flexure 67.

In the manufactured state of the suspension system 40, the flexures 67 are deflected from their relaxed state to provides a pre-loading force that biases the support structure 2 and the camera lens element 20 against the balls 75. This can be seen in FIGS. 2 and 10, noting that the flexure element 66 is formed from sheet material such that the base fitting 68 and moving fitting 69 are co-planar in their relaxed state. Nonetheless, the distance between the ends of each flexure 67 resolved in a direction orthogonal to the optical axis O (i.e. the length of the flexures) is greater than the distance between the ends of each flexure 67 resolved in a direction parallel to the optical axis O.

Each flexure 67 and its associated parts of the base fitting 68 and moving fitting 69 are identical in construction and are symmetrically placed around the optical axis O, to provide balanced forces and no unwanted torques.

The flexure element 67 is made of a suitable material that provides a good bearing, provides the desired mechanical properties for the flexures and is electrically conductive so that an electrical connection may be provided through the flexures. Typically the material is a metal having a relatively high yield, for example steel such as stainless steel.

The manufacturing process for the suspension system 40 in the first construction is relatively easy as it involves the simple building up of the stack by laying and adhering one flat layer on top of another.

The splits in the base fitting 68 and the moving fitting 69 mean that each flexure is formed from sheet material integrally with one of the parts 70 and one of the pads 72 as a separate component. During manufacture, each of these components may be manufactured from a single sheet of material. Similarly, the support plate 55 may be manufactured from a single sheet of material.

Advantageously, each of the support assembly 50 and moving assembly 60 may be may be made separately, and subsequently connected together by mounting the pads 72 of the flexure element 66 to the second insulator layer 59. An advantage of manufacturing these two assemblies 50 and 60 separately is to improve quality and yield, as each of the assemblies 50 and 60 can be tested before final assembly and sub-standard parts yielded out.

The laminated construction of the suspension system 40 provides advantages of reducing the size and easing manufacture. For example it is possible to avoid the need for plastic mouldings with accurate locating features. All components are planar and made from sheet materials, which are readily available accurately flat and accurately dimensioned. This has tolerance and yield benefits. The height of the suspension system 40 is determined largely by the height of the balls 75, since all other components are sandwiched between the bearing plate 52 and moving fitting 69. Balls 75 as small as 0.6 mm, or even 0.5 mm, are available and may used, allowing the entire suspension system 40 to achieve a height of around 0.8 mm to 1 mm.

Alternative constructions for the suspension system 40 will now be described. These constructions are modified as compared to the first construction but include some elements in common. For brevity a description of the common elements is not repeated. The common elements are given the same reference numerals and have the same construction as described above, except for the following modifications.

A second construction is shown in FIGS. 11 to 15.

Figure 11:
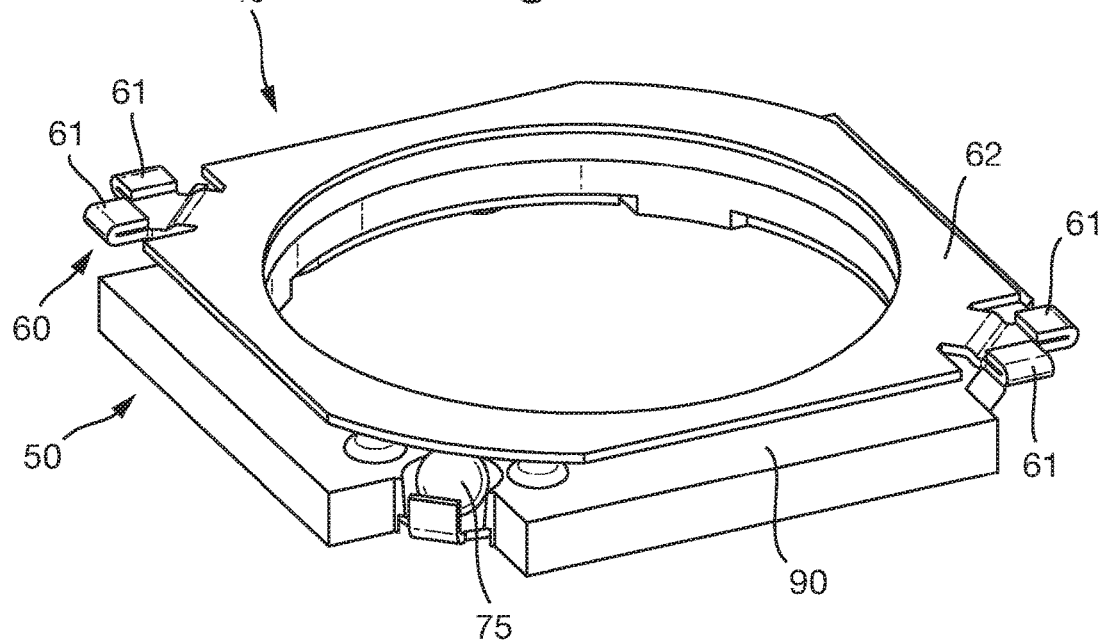
FIG. 11 is a perspective view of a suspension system in a second construction.
Figure 12:
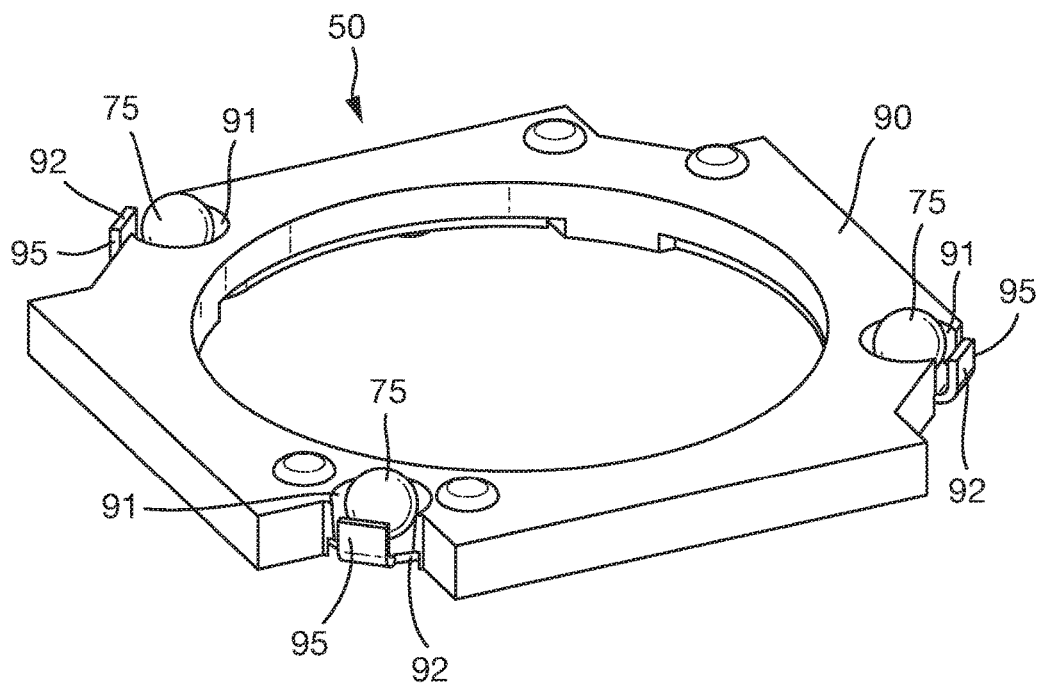
FIG. 12 is a perspective view of the support assembly of the suspension system of FIG. 11.

In the second construction, the moving assembly 60 has a similar construction, of which the moving plate 62 is shown in FIG. 11, but the support assembly 50 comprises a body 90 that is a relatively thick block of material, as shown in FIG. 12.

Figure 13:
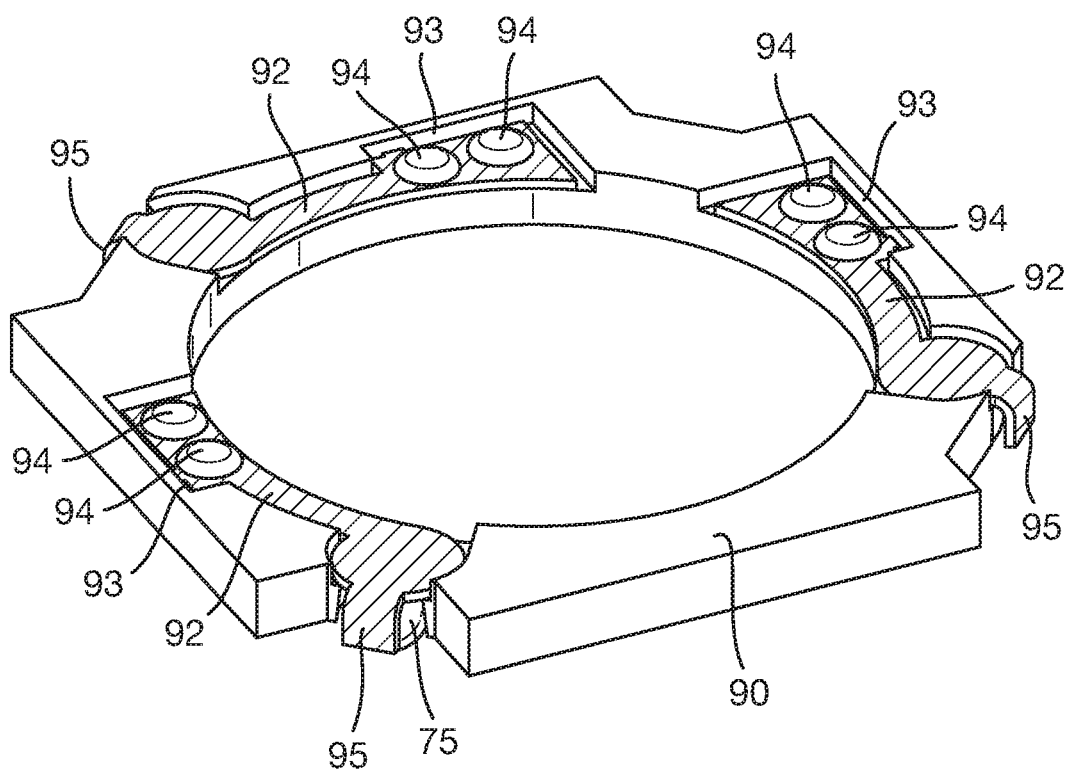
FIG. 13 is a perspective view of the underside of the support assembly of FIG. 12.

The body 90 is formed with three recesses 91 that each locate and retain a ball 75. The body 90 further comprises resilient members 92, one in respect of each recess 91, that are mounted to the rear side of the body 90 in respective shaped détentes 93 by heat stakes 94, as shown in FIG. 13 which shows the underside of the support assembly 50, although any other suitable means may be provided. The resilient members 92 are made of any suitable material having the desired resilience, typically metal, for example steel such as stainless steel. The resilient members 92 may be manufactured by cutting from a sheet.

The resilient members 92 are provided with retaining tabs 95 that extend around the side of the recesses, for example formed by bending. The retaining tabs 95 retain the balls 75 within the recesses 91. Alternatively, the balls 75 could be retained by extending the body 90 into the corners, which has the advantage of simplicity but the disadvantage that it takes up more space.

The resilient members 92 each overlie the rear side of a respective recess 91 where they engage the ball 75 located therein. The resilient members 92 are thus arranged, due to their intrinsic resilience, to bias the balls 75 against the camera lens element 20.

The balls 75 in their recesses 91 allow the moving plate 62 to move laterally with very little resistance. For OIS in a miniature camera, lateral movements of +/−75 microns are typically required. The recesses 91 are made to have a clearance greater than this all round the balls 75, and may typically have a clearance of 150 microns on all side 5 of the ball 75. In normal operation, the balls 75 are held between the camera lens element 20 and the resilient members 92, and little or no movement in the direction parallel to the optical axis O is possible.

The resilient members 92 serve to cushion the shock under exceptional load conditions such as when the camera apparatus 1 is dropped on to a hard surface. In drop conditions, high forces may be generated, which may lead to damage or failure. In particular, the point contact between the ball 75 and its support is vulnerable, as exceptionally high loads may be generated at the point, potentially causing damage to the ball or to the support. The resilient members 92 are therefore designed to deflect to take up the load.

Figure 14:
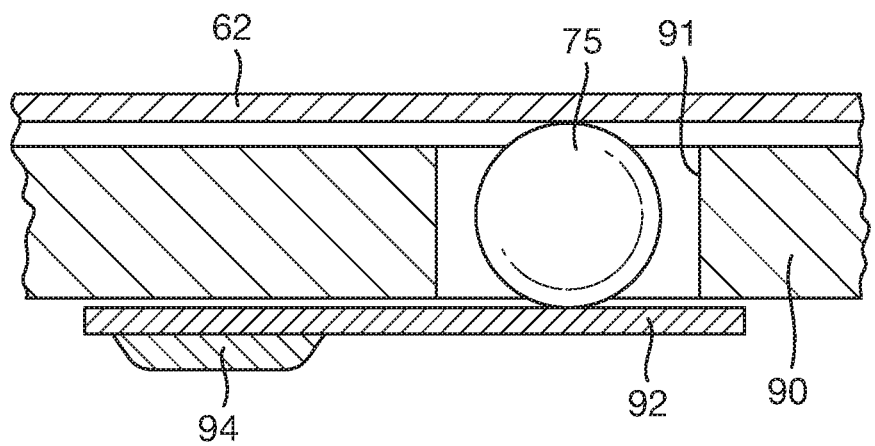
FIGS. 14 and 15 are cross-sectional views of resilient members of the support assembly of FIG. 12.
Figure 15:
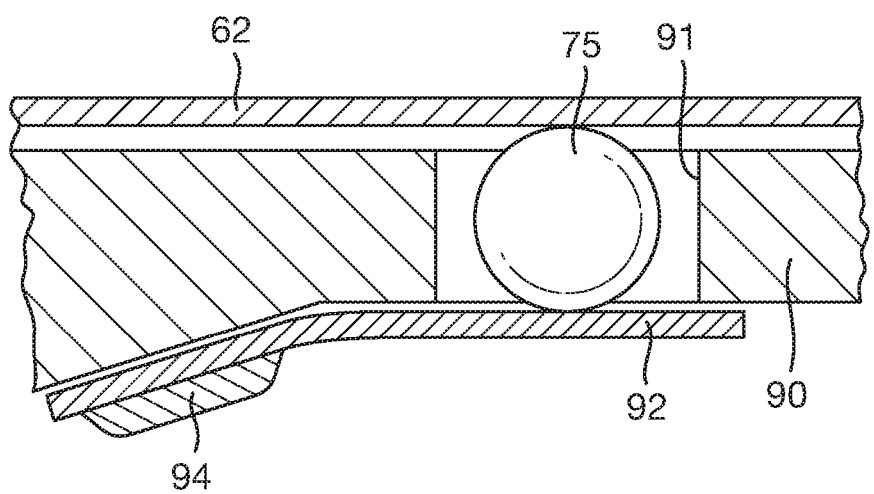

FIG. 14 is a schematic cross-section through a ball 75 in a recess 91 showing how the resilient member 92 engages the ball 75 and biases it against the moving plate 62 of the camera lens element 20. Even better performance can be achieved by pre-loading the resilient member 92. FIG. 15 is a schematic cross-section through a ball 75 in a recess 91 in an alternative where the resilient member 92 is pre-loaded. In this example, the resilient member 92 in its assembled state is bent from its flat relaxed state. The resilient member 92 accordingly exerts an increased biasing force on the ball 75. This helps to keep the ball 75 stable in normal operation since small loads, of less than the pre-load, will not deflect the resilient member 92. However, in shock conditions, the pre-load is overcome and the resilient member 92 deflects to prevent damage.

Although the resilient members 92 form part of the second construction in which the support assembly 50 comprises a body 90, the first construction could similarly be modified to include resilient members 92 functioning in the same way.

Figure 16:
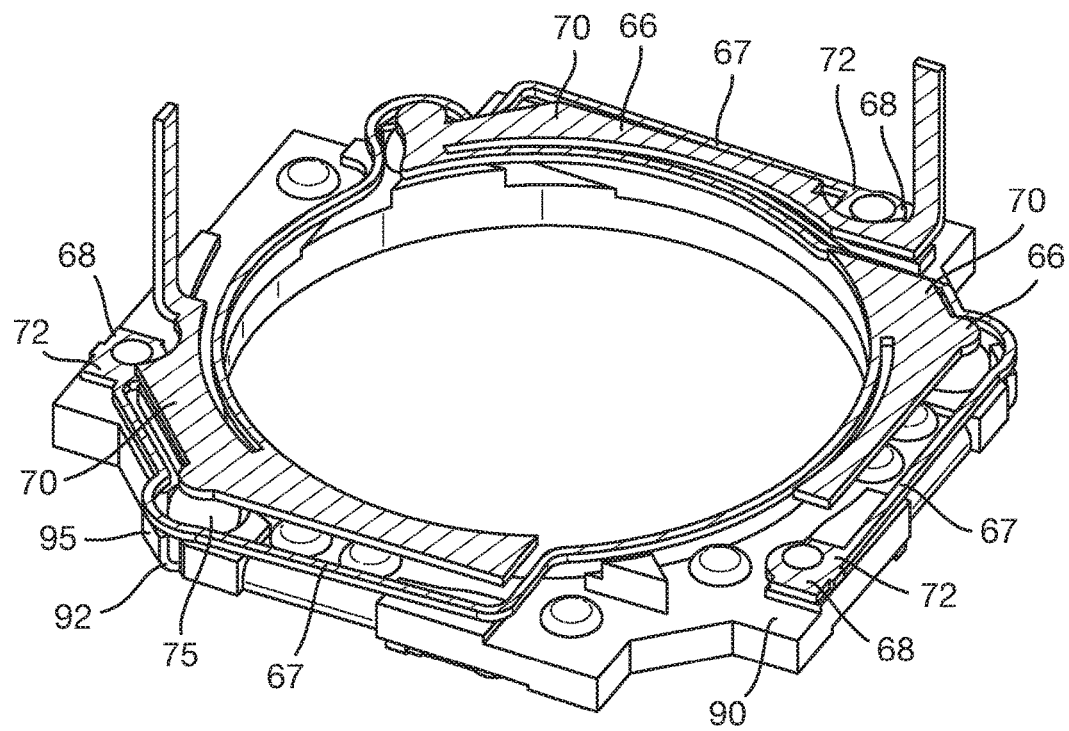
FIG. 16 is a perspective view of a suspension system in a third construction.
Figure 17:
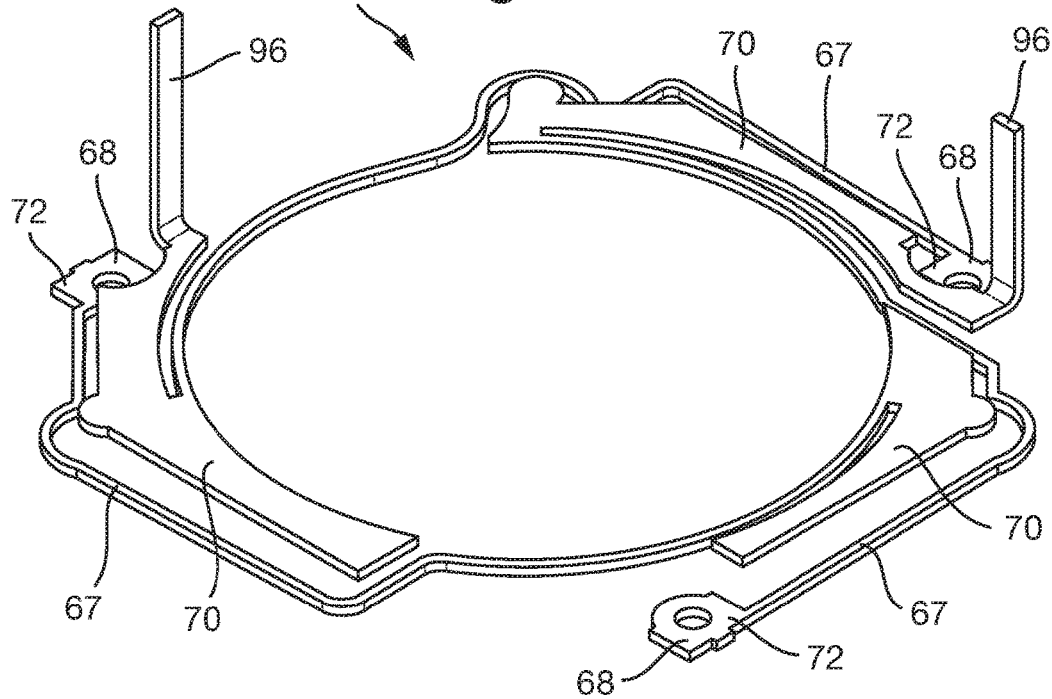
FIGS. 17 to 20 are perspective views of successive laminated components of the support assembly of the suspension system of FIG. 16.
Figure 18:
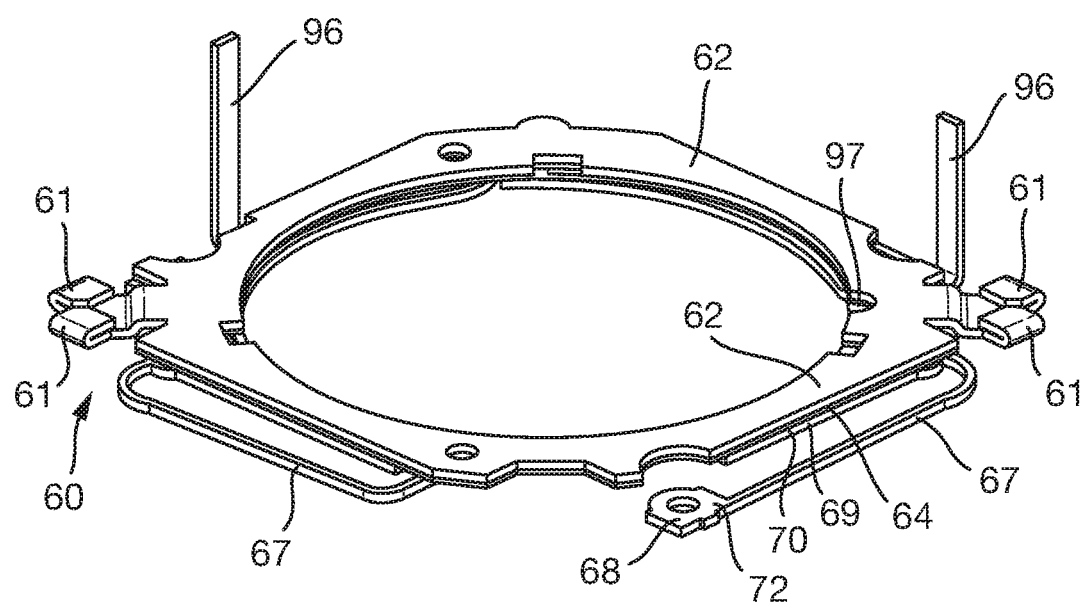

A third construction of the suspension system 40 is shown in FIGS. 16 to 18.

In the third construction, as shown in FIG. 16 the support assembly 50 comprises a body 90 similar to the second construction, but as shown in FIG. 17 the flexure element 66 of the moving assembly 60 has a modified arrangement comprising three flexures 67 and wherein the moving fitting 69 is split into three electrically isolated parts 70, each connected to a different flexure 67. Although the flexure element 66 is differently shaped, it has similar components and function to the first construction.

Two of the three electrically isolated parts 70 of the moving fitting 69 are provided with upstands 96 formed by bent portions of the parts 70 that protrude upwardly and are electrically connected to the axial actuation arrangement 24. The remaining part 70 of the moving fitting 69 is electrically connected to the moving plate 62, for example by applying solder to a pre-cut hole or via 97. The moving plate 62 in this construction is laminated on top of the moving fitting 69 with the third insulator layer 64 laminated in between.

Figure 19:
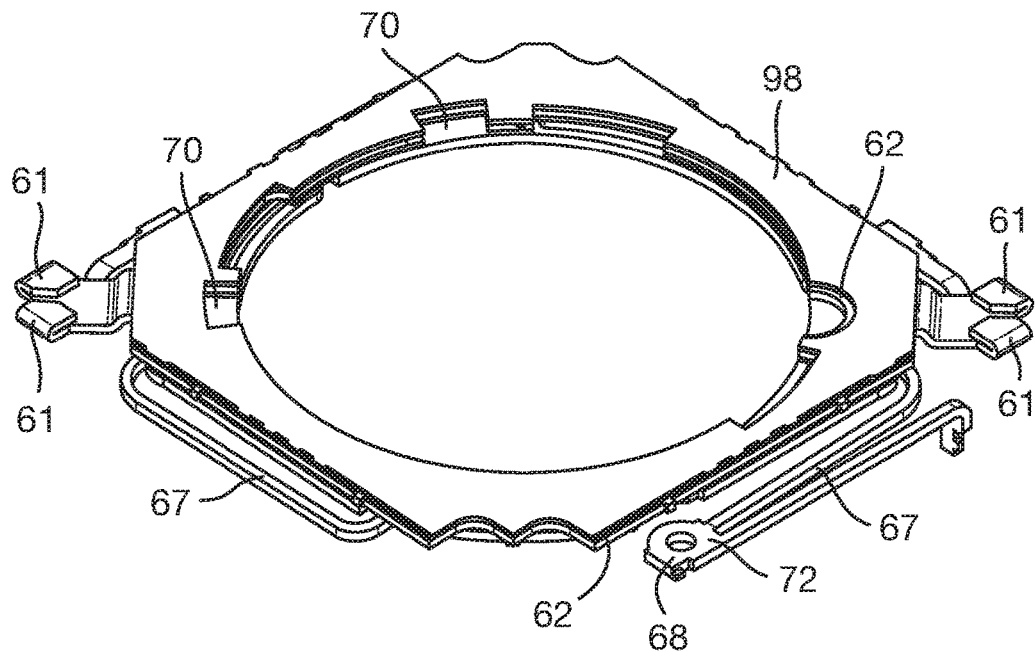
Figure 20:
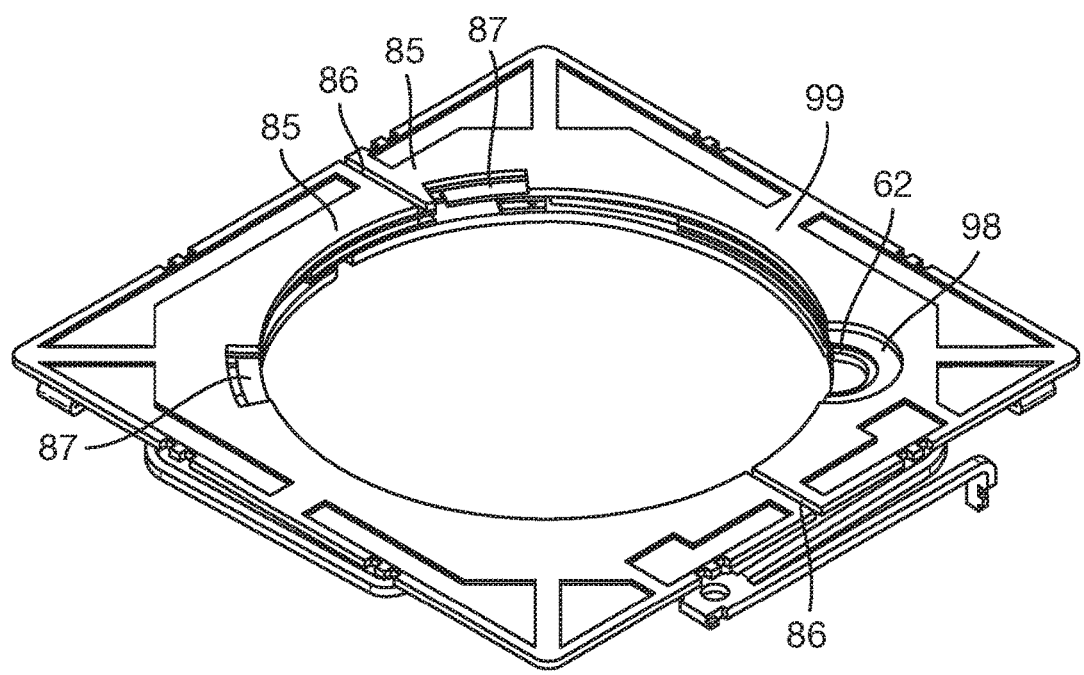

As an alternative to provision of the upstands 96, the moving assembly 60 may have the arrangement shown in FIGS. 19 and 20 which is intended for use when the axial actuation arrangement 24 employs a VCM.

As shown in FIG. 19, a fourth insulator layer 98 is laminated to the top surface of the moving fitting 69. The fourth insulator layer 98 is formed from sheet material and is a similar shape to the moving fitting 69.

As shown in FIG. 20, an interface plate 99 is laminated to the top surface of the fourth insulator layer 98. The interface plate 99 presents a generally square outer area to match the typical features found on the base of an axial actuation arrangement 24 that employs a VCM.

The interface plate 99 is split into two electrically isolated parts 85 by gaps 86, each of the parts 85 being electrically connected to a different one of the parts 70 of the moving fitting 69, for example by applying solder to a pre-cut hole or via 87, and each electrically connected to the axial actuation arrangement 24 for supply of drive signals thereto.

There will now be described the lateral actuation arrangement provided by the SMA actuator wires 80 connected between the support structure 40 and the camera lens element 20.

Each of the SMA actuator wires 80 extends perpendicular to the optical axis O and is held in tension, thereby applying a force between the support structure 4 and the camera lens element 20 in a direction perpendicular to the optical axis O. In operation, selective driving of the SMA actuator wires 80 causes them to move the camera lens element 20 relative to the support structure 4 in any direction orthogonal to the optical axis O. As an alternative, the SMA actuator wires 80 may be arranged inclined at a non-zero angle to the plane orthogonal to the optical axis O, which angle is preferably small. Irrespective of whether the SMA wires 80 are perpendicular to the optical axis O or inclined at a small angle to the plane perpendicular to the optical axis O, the arrangement of the SMA actuator wires 80 can be made very compact, particularly in the direction along the optical axis O.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA actuator wires 80 causes them to decrease in length.

The SMA actuator wires 80 may be made of any suitable SMA material, for example Nitinol or another Titanium-alloy SMA material. Advantageously, the material composition and pre-treatment of the SMA actuator wires 80 is chosen to provide phase change over a range of temperature that is above the expected ambient temperature during normal operation and as wide as possible to maximise the degree of positional control.

On heating of one of the SMA actuator wires 80, the stress therein increases and it contracts, causing movement of the camera lens element 20. A range of movement occurs as the temperature of the SMA increases over the range of temperature in which there occurs the transition of the SMA material from the Martensite phase to the Austenite phase. Conversely, on cooling of one of the SMA actuator wires 80 so that the stress therein decreases, it expands under the force from opposing ones of the SMA actuator wires 80. This allows the camera lens element 20 to move in the opposite direction.

As shown in FIG. 2, the SMA actuator wires 80 have an arrangement in a loop at different angular positions around the optical axis O to provide two pairs of opposed SMA actuator wires 80 that are perpendicular to each other. Thus each pair of opposed SMA actuator wires 80 is capable on selective driving to move the camera lens element 20 in one of two perpendicular directions X and Y orthogonal to the optical axis O. As a result, the SMA actuator wires 80 are capable of being selectively driven to move the camera lens element 20 relative to the support structure 4 to any position in a range of movement in two directions orthogonal to the optical axis O. The magnitude of the range of movement depends on the geometry and the range of contraction of the SMA actuator wires 80 within their normal operating parameters.

The position of the camera lens element 20 relative to the support structure 4 perpendicular to the optical axis O is controlled by selectively varying the temperature of the SMA actuator wires 80. This is achieved by passing through SMA actuator wires 80 selective drive signals that provide resistive heating. Heating is provided directly by the drive current. Cooling is provided by reducing or ceasing the drive current to allow the camera lens element 20 to cool by conduction, convection and radiation to its surroundings.

Figure 21:
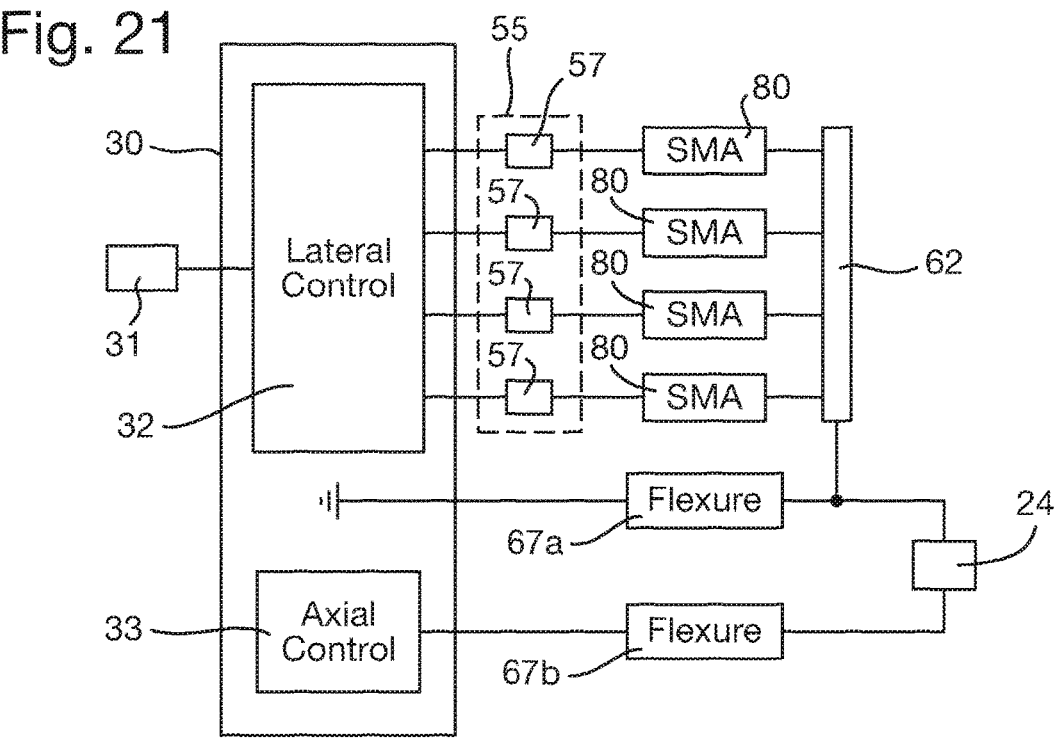
FIGS. 21 and 22 are a diagrams of control circuits associated with different constructions of the suspension system.
Figure 22:
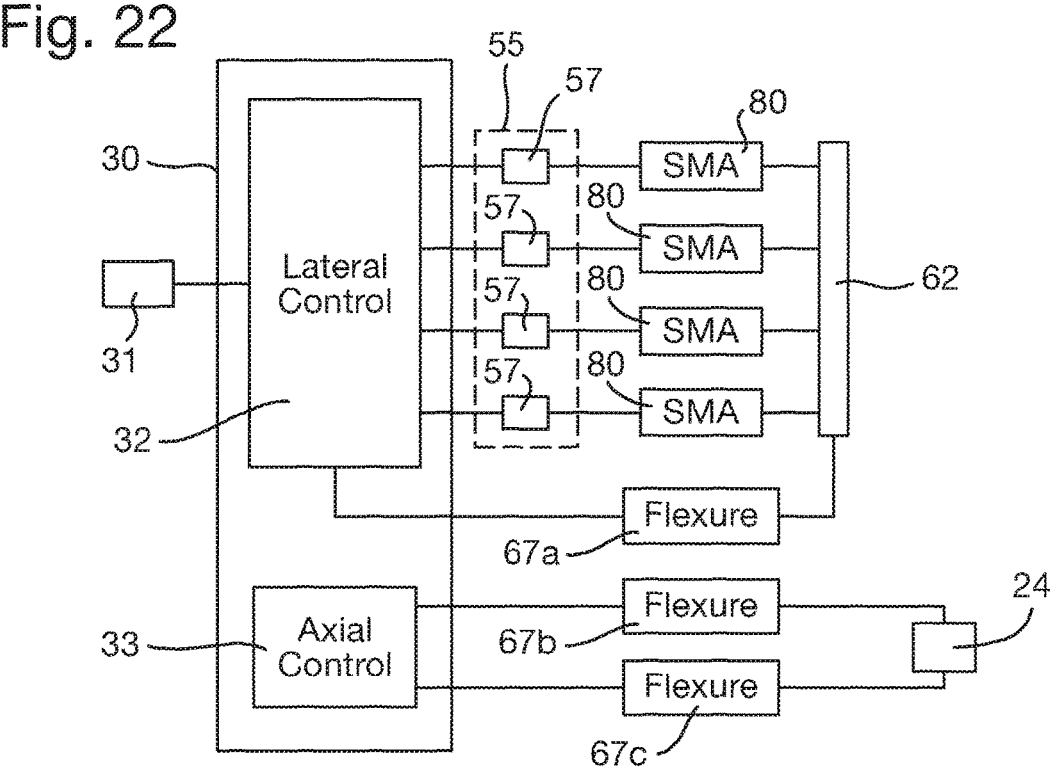

Control circuitry for the camera apparatus is shown in FIGS. 21 and 22 and will now be described.

The circuitry shown in FIG. 21 is associated with the first construction of the suspension system 40 including two flexures 67.

The gyroscope sensor 31 is a vibration sensor which detects the vibrations that the camera apparatus 1 is experiencing and outputs signals representative of the angular velocity of the camera lens element 20. The gyroscope sensor 31 is typically a pair of miniature gyroscopes, for detecting vibration around two axes perpendicular to each other and the optical axis O, although in general larger numbers of gyroscopes or other types of vibration sensor could be used.

A lateral control circuit 32 implemented in the IC chip 30 is arranged to generate drive signals for the SMA actuator wires 80. These drive signals are generated in response to the output signals of the gyroscope sensor 31 so as to drive movement of the camera lens element 20 to stabilise an image focused by the camera lens element 20 on the image sensor 6, thereby providing OIS.

The lateral control circuit 32 is electrically connected for supply of the drive signals to the static ends of each of the SMA actuator wires 80 at the support structure 4, in particular through the parts 57 of the support plate 55. To complete the circuits for the respective drive signals, the moving end of each SMA actuator wire 80 is electrically connected to ground (or in general any fixed potential) through the moving plate 62 and a first one of the flexures 67a.

The drive signals may be generated using a resistance feedback control technique for example as disclosed in any of International Patent Application No. PCT/GB2013/051325; International Patent Application No. PCT/GB2013/052959; WO-2012/066285; WO-2012/020212; WO-2011/104518; WO-2012/038703; WO-2010/089529 or WO-2010029316, each of which is incorporated herein by reference.

An axial control circuit 33 implemented in the IC chip 30 is arranged to generate drive signals for the axial actuation arrangement 24. These drive signals may be generated on the basis of user input or automatically for example using an autofocus routine in the case that axial movement changes the focus of the camera lens element 20.

The axial control circuit 33 is electrically connected for supply of the drive signals to the axial actuation arrangement 24 through the second one of the flexures 67b. To complete the circuit for the drive signal, the axial actuation arrangement 24 is also electrically connected to ground (or in general any fixed potential) through the first one of the flexures 67a.

The first one of the flexures 67a therefore forms part of the circuit for axial and lateral drive signals. In cases where this risks cross-talk that can interfere with the control, particularly where any of the drive signals are pulse-width modulated, then the axial and lateral drive signals may be separated using an additional flexure 67 as in the second and third constructions of the suspension system 40. In this case, the control circuitry may take the form shown in FIG. 22. This is identical to that of FIG. 21 except as follows. The first flexure 67a is connected to the lateral control circuit 32 and the moving plate 62 to complete the circuit for the lateral drive signals. The axial actuation arrangement 24 is not connected to the first flexure 67a but is connected to the lateral control circuit 33 through the second flexure 67b and the third flexure 67c.

The invention claimed is:

1. A suspension system for suspending a camera lens element comprising at least one lens in a manner allowing movement orthogonal to the optical axis of the at least one lens, the suspension system comprising:
    a support structure;
    a camera lens element comprising at least one lens having an optical axis;
    at least one ball disposed between the support structure and the camera lens element allowing movement of the camera lens element relative to the support structure orthogonal to the optical axis;
    a biasing arrangement comprising at least one flexure connected between the support structure and the camera lens element, wherein the at least one flexure is arranged to bias the support structure and the camera lens element against the at least one ball whilst permitting said movement of the camera lens element relative to the support structure orthogonal to the optical axis and is arranged to provide a lateral biasing force that biases the camera lens element towards a central position from any direction around the central position; and
    a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens.

2. A suspension system for suspending a camera lens element comprising at least one lens in a manner allowing movement orthogonal to the optical axis of the at least one lens, the suspension system comprising:
    a support structure;
    a camera lens element comprising at least one lens having an optical axis;
    at least one ball disposed between the support structure and the camera lens element allowing movement of the camera lens element relative to the support structure orthogonal to the optical axis;
    a biasing arrangement connected between the support structure and the camera lens element that biases the support structure and the camera lens element against the at least one ball whilst permitting said movement of the camera lens element relative to the support structure orthogonal to the optical axis, wherein the biasing arrangement comprises at least one flexure; and
    a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens, wherein the average width of the at least one flexure orthogonal to the optical axis is greater than the average thickness of the at least one flexure parallel to the optical axis.

3. A suspension system for suspending a camera lens element comprising at least one lens in a manner allowing movement orthogonal to the optical axis of the at least one lens, the suspension system comprising:
a support structure;
a camera lens element comprising at least one lens having an optical axis;
at least one ball disposed between the support structure and the camera lens element allowing movement of the camera lens element relative to the support structure orthogonal to the optical axis;
a biasing arrangement connected between the support structure and the camera lens element that biases the support structure and the camera lens element against the at least one ball whilst permitting said movement of the camera lens element relative to the support structure orthogonal to the optical axis, wherein the biasing arrangement comprises at least one flexure; and
a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens,
and wherein the at least one flexure is deflected from its relaxed state so that it provides a pre-loading force that biases the support structure and the camera lens element against the at least one ball.

4. A suspension system for suspending a camera lens element comprising at least one lens in a manner allowing movement orthogonal to the optical axis of the at least one lens, the suspension system comprising:
a support structure;
a camera lens element comprising at least one lens having an optical axis;
at least one ball disposed between the support structure and the camera lens element allowing movement of the camera lens element relative to the support structure orthogonal to the optical axis;
a biasing arrangement connected between the support structure and the camera lens element that biases the support structure and the camera lens element against the at least one ball whilst permitting said movement of the camera lens element relative to the support structure orthogonal to the optical axis, wherein the biasing arrangement comprises at least one flexure; and
a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens,
and wherein the distance between the ends of the at least one flexure resolved in a direction orthogonal to the optical axis is greater than the distance between the ends of the at least one flexure resolved in a direction parallel to the optical axis.

5. A suspension system for suspending a camera lens element comprising at least one lens in a manner allowing movement orthogonal to the optical axis of the at least one lens, the suspension system comprising:
a support structure;
a camera lens element comprising at least one lens having an optical axis;
at least one ball disposed between the support structure and the camera lens element allowing movement of the camera lens element relative to the support structure orthogonal to the optical axis;
a biasing arrangement connected between the support structure and the camera lens element that biases the support structure and the camera lens element against the at least one ball whilst permitting said movement of the camera lens element relative to the support structure orthogonal to the optical axis, wherein the biasing arrangement comprises at least one flexure; and
a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens,
and wherein the at least one flexure extends at least 90° around the optical axis as measured between the ends of the at least one flexure.

6. A suspension system for suspending a camera lens element comprising at least one lens in a manner allowing movement orthogonal to the optical axis of the at least one lens, the suspension system comprising:
a support structure;
a camera lens element comprising at least one lens having an optical axis;
at least one ball disposed between the support structure and the camera lens element allowing movement of the camera lens element relative to the support structure orthogonal to the optical axis;
a biasing arrangement connected between the support structure and the camera lens element that biases the support structure and the camera lens element against the at least one ball whilst permitting said movement of the camera lens element relative to the support structure orthogonal to the optical axis, wherein the biasing arrangement comprises at least one flexure; and
a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens,
and wherein the length of the at least one flexure is greater than the average width of the at least one flexure orthogonal to the optical axis.

7. A suspension system for suspending a camera lens element comprising at least one lens in a manner allowing movement orthogonal to the optical axis of the at least one lens, the suspension system comprising:
a support structure;
a camera lens element comprising at least one lens having an optical axis;
at least one ball disposed between the support structure and the camera lens element allowing movement of the camera lens element relative to the support structure orthogonal to the optical axis;

a biasing arrangement connected between the support structure and the camera lens element that biases the support structure and the camera lens element against the at least one ball whilst permitting said movement of the camera lens element relative to the support structure orthogonal to the optical axis, wherein the biasing arrangement comprises at least one flexure; and a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens, and wherein the suspension system comprises a support assembly forming part of the support structure and a moving assembly forming part of the camera lens element, each of the support assembly and the moving assembly having a laminated structure and the at least one flexure being connected between the support assembly and the moving assembly.

8. A suspension system according to claim 7, further comprising a base fitting at one end of the at least one flexure that is mounted to the support structure and a moving fitting at the other end of the at least one flexure that is mounted to the camera lens element, wherein the at least one flexure, the base fitting and moving fitting are formed integrally from sheet material.

9. A suspension system according to claim 8, wherein the support structure comprises a support plate formed from sheet material to which the base fitting is mounted, and the camera lens element comprises a moving plate formed from sheet material to which the moving fitting is mounted.

10. A suspension system according to claim 8, wherein the moving fitting is split into at least two electrically isolated parts each connected to different flexures, at least one of which is electrically connected to the moving plate.

11. A suspension system according to claim 9, further comprising at least one electrically insulating layer laminated with the support plate and at least one electrically insulating layer laminated with the moving plate.

12. A suspension system according to claim 9, wherein the support plate and moving plate are each shaped with crimps crimping the SMA shape memory alloy actuator wires.

13. A suspension system according to claim 12, wherein the support plate is split into at least two electrically isolated parts each crimped to different SMA shape memory alloy actuator wires.

14. A suspension system according to claim 13, wherein the plural SMA shape memory alloy actuator wires consist of a total of four SMA shape memory alloy wires and the support plate is split into four electrically isolated parts each crimped to a different SMA shape memory alloy actuator wire.

15. A suspension system according to claim 9, further comprising a bearing plate formed from sheet material laminated with the support plate, the bearing plate bearing the at least one ball.

16. A suspension system according to claim 15, wherein the bearing plate is on the opposite side of the support plate from the camera lens element, the support plate having an aperture in respect of the or each ball through which the bearing plate engages the at least one ball.

17. A suspension system according to claim 9, wherein the moving plate is a single plate shaped with crimps crimping each SMA shape memory alloy actuator wire.

18. A suspension system according to claim 9, wherein the moving fitting is a plate laminated with the moving plate.

19. A suspension system according to claim 18, wherein the moving fitting bears the at least one ball.

20. A suspension system for suspending a camera lens element comprising at least one lens in a manner allowing movement orthogonal to the optical axis of the at least one lens, the suspension system comprising:
  a support structure;
  a camera lens element comprising at least one lens having an optical axis;
  at least one ball disposed between the support structure and the camera lens element allowing movement of the camera lens element relative to the support structure orthogonal to the optical axis;
  a biasing arrangement connected between the support structure and the camera lens element that biases the support structure and the camera lens element against the at least one ball whilst permitting said movement of the camera lens element relative to the support structure orthogonal to the optical axis, wherein the biasing arrangement comprises at least one flexure and an electrical connection is made through the at least one flexure from the support structure to the camera lens element; and
  a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens.

21. A suspension system according to claim 20, wherein the electrical connection is made through the at least one flexure to the SMA shape memory alloy actuator wires.

22. A suspension system according to claim 21, further comprising a lateral control circuit for generating drive signals for the SMA shape memory alloy actuator wires, an electrical connection being made through at least one of the flexures from the lateral control circuit to the SMA shape memory alloy actuator wires.

23. A suspension system according to claim 20, wherein the camera lens element comprises:
  a lens carriage;
  one or more lenses supported on the lens carriage in a manner in which at least one of the one or more lenses is movable along the optical axis relative to the lens carriage; and
  an axial actuation arrangement arranged to drive movement of said at least one of the one or more lenses along the optical axis relative to the lens carriage,
  an electrical connection being made through the at least one flexure to the axial actuation arrangement.

24. A suspension system according to claim 23, further comprising an axial control circuit for generating drive signals for the axial actuation arrangement, an electrical connection being made through at least two of the flexures from the axial control circuit to the axial actuation arrangement.

25. A suspension system for suspending a camera lens element comprising at least one lens in a manner allowing movement orthogonal to the optical axis of the at least one lens, the suspension system comprising:
  a support structure;
  a camera lens element comprising at least one lens having an optical axis;

at least one ball disposed between the support structure and the camera lens element allowing movement of the camera lens element relative to the support structure orthogonal to the optical axis;

a biasing arrangement connected between the support structure and the camera lens element that biases the support structure and the camera lens element against the at least one ball whilst permitting said movement of the camera lens element relative to the support structure orthogonal to the optical axis, wherein the biasing arrangement comprises at least one flexure and the support structure further comprises a resilient member engaging each ball and arranged to bias the ball against the camera lens element; and a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens.

26. A suspension system for suspending a camera lens element comprising at least one lens in a manner allowing movement orthogonal to the optical axis of the at least one lens, the suspension system comprising:

a support structure;

a camera lens element comprising at least one lens having an optical axis;

wherein the at least one ball comprises at least three balls disposed between the support structure and the camera lens element allowing movement of the camera lens element relative to the support structure orthogonal to the optical axis;

a biasing arrangement connected between the support structure and the camera lens element that biases the support structure and the camera lens element against the at least one ball whilst permitting said movement of the camera lens element relative to the support structure orthogonal to the optical axis; and a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens.

27. A suspension system according to claim 26, wherein the at least one ball consists of a total of three balls.

28. A suspension system for suspending a camera lens element comprising at least one lens in a manner allowing movement orthogonal to the optical axis of the at least one lens, the suspension system comprising:

a support structure;

a camera lens element comprising at least one lens having an optical axis, wherein the at least one lens has a diameter of at most 10 mm;

at least one ball disposed between the support structure and the camera lens element allowing movement of the camera lens element relative to the support structure orthogonal to the optical axis;

a biasing arrangement connected between the support structure and the camera lens element that biases the support structure and the camera lens element against the at least one ball whilst permitting said movement of the camera lens element relative to the support structure orthogonal to the optical axis; and a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens.

29. A suspension system for suspending a camera lens element comprising at least one lens in a manner allowing movement orthogonal to the optical axis of the at least one lens, the suspension system comprising:

a support structure;

further comprising an image sensor mounted on the support structures;

a camera lens element comprising at least one lens having an optical axis, the camera lens element being arranged to focus an image on the image sensor;

at least one ball disposed between the support structure and the camera lens element allowing movement of the camera lens element relative to the support structure orthogonal to the optical axis;

a biasing arrangement connected between the support structure and the camera lens element that biases the support structure and the camera lens element against the at least one ball whilst permitting said movement of the camera lens element relative to the support structure orthogonal to the optical axis; and a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens.

30. A suspension system for suspending a camera lens element comprising at least one lens in a manner allowing movement orthogonal to the optical axis of the at least one lens, the suspension system comprising:

a support structure;

wherein the camera lens element comprises a camera lens element comprising:

a lens carriage;

one or more lenses having an optical axis, the one or more lenses being supported on the lens carriage in a manner in which at least one of the one or more lenses is movable along the optical axis relative to the lens carriage; and an axial actuation arrangement arranged to drive movement of said at least one of the one or more lenses along the optical axis relative to the lens carriage;

at least one ball disposed between the support structure and the camera lens element allowing movement of the camera lens element relative to the support structure orthogonal to the optical axis;

a biasing arrangement connected between the support structure and the camera lens element that biases the support structure and the camera lens element against the at least one ball whilst permitting said movement of the camera lens element relative to the support structure orthogonal to the optical axis; and a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens.

31. A suspension system for suspending a camera lens element comprising at least one lens in a manner allowing movement orthogonal to the optical axis of the at least one lens, the suspension system comprising:
- a support structure;
- a camera lens element comprising at least one lens having an optical axis;
- at least one ball disposed between the support structure and the camera lens element allowing movement of the camera lens element relative to the support structure orthogonal to the optical axis;
- a biasing arrangement connected between the support structure and the camera lens element that biases the support structure and the camera lens element against the at least one ball whilst permitting said movement of the camera lens element relative to the support structure orthogonal to the optical axis; and
- a lateral actuation arrangement comprising, wherein said plural SMA wires consist of a total of four SMA shape memory alloy wires connected between the support structure and the camera lens element in an arrangement wherein the shape memory alloy actuator wires are arranged, on selective driving, to move the movable element relative to the support structure in any direction orthogonal to the optical axis of the at least one lens.

32. A suspension system for suspending a camera lens element comprising at least one lens in a manner allowing movement orthogonal to the optical axis of the at least one lens, the suspension system comprising:
- a support structure;
- a camera lens element comprising at least one lens having an optical axis;
- at least one ball disposed between the support structure and the camera lens element allowing movement of the camera lens element relative to the support structure orthogonal to the optical axis;
- a biasing arrangement connected between the support structure and the camera lens element that biases the support structure and the camera lens element against the at least one ball whilst permitting said movement of the camera lens element relative to the support structure orthogonal to the optical axis; and
- a lateral actuation arrangement comprising plural shape memory alloy actuator wires connected between the support structure and the camera lens element in an arrangement wherein the shape memory alloy actuator wires are arranged, on selective driving, to move the movable element relative to the support structure in any direction orthogonal to the optical axis of the at least one lens;
- further comprising a lateral control circuit for generating drive signals for the lateral actuation arrangement.

33. A suspension system according to claim 32, further comprising:
- a vibration sensor arranged to generate output signals representative of the vibration of the system; and
- the lateral control circuit being arranged to generate drive signals for the SMA shape memory alloy actuator wires in response to the output signals of the vibration sensor for driving the movement of the camera lens element to stabilise an image focused by the camera lens element.

* * * * *